(12) United States Patent
Jung et al.

(10) Patent No.: US 10,170,127 B2
(45) Date of Patent: Jan. 1, 2019

(54) METHOD AND APPARATUS FOR SENDING MULTIMEDIA DATA

(71) Applicant: SAMSUNG ELECTRONICS CO., LTD., Suwon-si (KR)

(72) Inventors: Kyung-hun Jung, Seoul (KR); Eun-mi Oh, Seoul (KR); Jong-hoon Jeong, Suwon-si (KR); Seon-ho Hwang, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/324,922

(22) PCT Filed: Jul. 7, 2015

(86) PCT No.: PCT/KR2015/007014
§ 371 (c)(1),
(2) Date: Jan. 9, 2017

(87) PCT Pub. No.: WO2016/006915
PCT Pub. Date: Jan. 14, 2016

(65) Prior Publication Data
US 2017/0206906 A1 Jul. 20, 2017

(30) Foreign Application Priority Data

Jul. 8, 2014 (KR) .................. 10-2014-0085369
Jun. 10, 2015 (KR) .................. 10-2015-0081982

(51) Int. Cl.
*G10L 19/022* (2013.01)
*H04L 29/06* (2006.01)
*G10L 19/005* (2013.01)

(52) U.S. Cl.
CPC .......... *G10L 19/022* (2013.01); *G10L 19/005* (2013.01); *H04L 65/602* (2013.01);
(Continued)

(58) Field of Classification Search
CPC ..................................................... G10L 19/022
(Continued)

(56) References Cited

U.S. PATENT DOCUMENTS

RE43,668 E 9/2012 Pogrebinsky
8,340,078 B1 12/2012 Wu et al.
(Continued)

FOREIGN PATENT DOCUMENTS

EP 1833189 A2 * 9/2007 ........... H04L 1/1854
KR 10-2000-0059416 A 10/2000
(Continued)

OTHER PUBLICATIONS

International Search Report (PCT/ISA/210) dated Oct. 13, 2015 issued by the International Searching Authority in counterpart International Application No. PCT/KR2015/007014.
Written Opinion (PCT/ISA/237) dated Oct. 13, 2015 issued by the International Searching Authority in counterpart International Application No. PCT/KR2015/007014.
(Continued)

*Primary Examiner* — Bharatkumar S Shah
(74) *Attorney, Agent, or Firm* — Sughrue Mion, PLLC

(57) ABSTRACT

A method and apparatus for transmitting multimedia data are provided. A first device, which provides an audio signal to a second device, includes: a control unit that divides an audio signal input to the first device into a plurality of audio frames, compares a current audio frame among the plurality of audio frames with the at least one previous audio frame prestored in the memory of the first device, and selects one of the prestored previous audio frames based on similarity of the prestored previous audio frame and the current audio frame; and a communication unit that transmits an identification value of the selected previous audio frame to the second device.

13 Claims, 23 Drawing Sheets

(52) U.S. Cl.
CPC .......... *H04L 65/604* (2013.01); *H04L 65/607* (2013.01); *H04L 65/80* (2013.01)

(58) Field of Classification Search
USPC ........................................................ 704/500
See application file for complete search history.

(56) References Cited

U.S. PATENT DOCUMENTS

| | | |
|---|---|---|
| 8,849,202 B2 | 9/2014 | Linde et al. |
| 2006/0167693 A1* | 7/2006 | Kapilow .............. G10L 19/005 704/258 |
| 2009/0147853 A1 | 6/2009 | Dane et al. |
| 2011/0222405 A1* | 9/2011 | Bugenhagen ....... H04L 41/5003 370/235 |
| 2013/0102251 A1 | 4/2013 | Linde et al. |

FOREIGN PATENT DOCUMENTS

| | | |
|---|---|---|
| KR | 10-0792209 B1 | 1/2008 |
| KR | 10-2008-0112000 A | 12/2008 |
| KR | 0112000 A * | 12/2008 |

OTHER PUBLICATIONS

Communication dated Dec. 1, 2017, issued by the European Patent Office in counterpart European Patent Application No. 15819284.9.

* cited by examiner

\*\* FRAME SIZE AND NUMBER OF FRAMES ARE
DETERMINED ACCORDING TO BIT RATE
(IN CASE OF 1 PACKET SIZE = 512 BYTES)

| BIT RATE | FRAME SIZE (byte) | NUMBER OF FRAMES | PACKET SIZE (byte) | EXTRA |
|---|---|---|---|---|
| 180kbps | 65 | 7 | 455 | 57 |
| 229kbps | 83 | 6 | 498 | 14 |
| 320kbps | 116 | 4 | 464 | 48 |
| 352.8kbps | 128 | 4 | 512 | 0 |

1 PACKET SIZE (512 byte)

▒ : RESIDUAL DATA REGION

FIG. 4
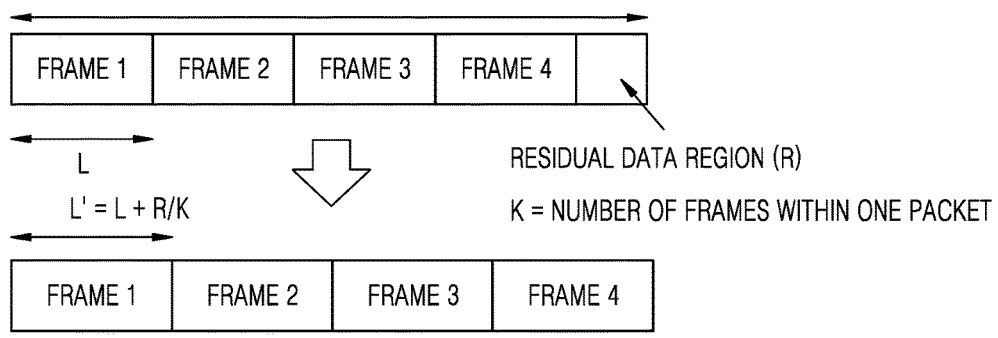
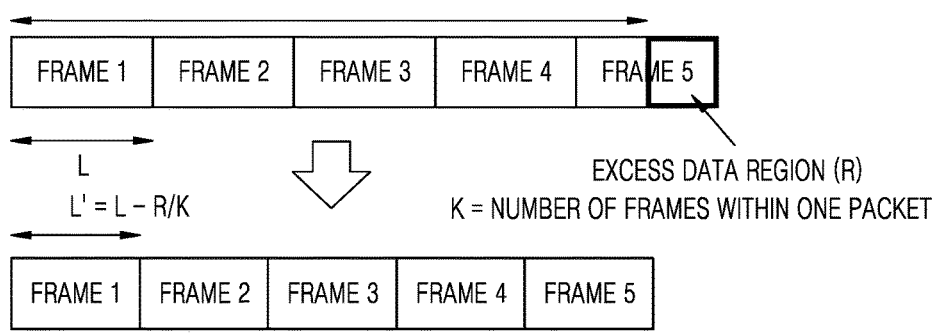

METHOD AND APPARATUS FOR SENDING MULTIMEDIA DATA

CROSS-REFERENCE TO RELATED APPLICATIONS

This application is a National stage entry of International Application No. PCT/KR2015/007014, filed on Jul. 7, 2015, which claims priority based on Korean Patent Application No. 10-2014-0085369 filed Jul. 8, 2014, and No. 10-2015-0081982 filed Jun. 10, 2015, the contents of all of which are incorporated herein by reference in their entirety.

TECHNICAL FIELD

The present disclosure relates to a method and apparatus for transmitting multimedia data by using a wireless communication and a data network.

BACKGROUND ART

There are methods for solving aforementioned problems of data transmission in wireless communications and networks. For example, in order to reduce interference between two networks in a plurality of wireless environments, a network situation is monitored by using various parameters capable of recognizing a transmission state between the networks, and various methods for reducing interference between the two networks are applied according to the result of the monitoring. Most of these methods use receiver signal strength indication (RSSI), system noise level information, a power spectrum of a transmitted signal, and the like for monitoring a network situation. Interference between different data networks is minimized by adjusting transmitter power in an RF end or changing a channel map used upon data transmission according to these results. As another method, there are a method of adjusting priority levels between a plurality of wireless networks or adjusting antenna isolation, a method of configuring an antenna system to enable coexistence between networks by using an antenna switch when the same antenna is shared in a plurality of networks, and the like.

Also, a method is used which adjusts a data rate by using packet-loss information upon packet transmission or adjusts an amount of multimedia data transmitted according to a channel situation and a bandwidth by using a scalable codec.

When a packet is lost or distorted, a frame error occurs and an error concealment method is used for interpolating the frame error. As an error concealment method commonly used in the case of transmitting audio or audio information, there are a muting method of alleviating the influence of an error on an output signal by reducing a volume in an error frame, a repetition method of reconstructing a signal of an error frame by repetitively reproducing a previous good frame of the error frame, and an interpolation method of predicting a parameter of an error frame by interpolating a parameter of a previous good frame and a parameter of a next good frame.

On the other hand, data transmission methods such as discontinuous transmission (DTX) and discontinuous reception (DRX) are commonly used for improving power efficiency of a device that transmits data and frequency efficiency of a network.

Also, when data is transmitted through a wireless network, data is transmitted through an unstable channel, as compared to a wired network. Thus, an error may inevitably occur in data transmission. Accordingly, a device must transmit data at high transmission power so as to reduce an error rate of data transmission. In this case, there is a problem that power efficiency of the device is reduced.

DETAILED DESCRIPTION OF THE INVENTION

Technical Problem

There are methods for reducing interference occurring in a plurality of wireless networks and efficiently transmitting data. However, the existing methods monitor a network environment and adjust signal strength by using the result of the monitoring, or minimize interference between channels by adjusting antenna isolation. As such, methods for minimizing interference between networks in an RF end are usually applied.

In the case of adjusting a bit rate according to a situation of a data network, an existing method uses a method of predicting an available bandwidth by using packet-loss information and adjusting the bit rate according to the predicted available bandwidth. However, when interference occurs between a plurality of wireless networks, a method of adjusting a bit rate by using one parameter may not accurately reflect a situation according to the interference between the networks.

In the case of utilizing a real-time audio or video streaming service by using a wireless network, latency and robustness to a channel error are important factors. In general, the latency and the robustness are determined by a size of an input buffer of a receiving end. That is, when the size of the input buffer is large, robustness to an error becomes better, but latency occurs. When the size of the input buffer is small, latency becomes shorter, but robustness is reduced. In the case of audio data transmitted together with video like TV, synchronization (sync) and latency are very important. However, in the case of data in which only an audio signal exists, synchronization and latency are less important, as compared to the case of video. However, since the existing method uses a fixed buffer size without taking into account a type of input data, the existing method does not effectively cope with synchronization and latency occurring according to a data type.

In the error concealment, the repetition method of reconstructing an error signal by using a previous good frame as described above cannot expect excellent performance because problems such as discontinuity and phase mismatch between frames occur in the case of simple repetition. Since the interpolation method using a previous good frame and a next good frame must delay one frame, the interpolation method is not appropriate for use in a real-time audio or video streaming service sensitive to latency.

Problems to be solved in some embodiments are to provide a method of analyzing a wireless network environment such as a plurality of network status parameters capable of knowing a network interference in the wireless network environment and a change in a bandwidth according to a plurality of wireless peripheral devices using the same network, efficiently adjusting a bit rate of multimedia data such as audio and video by using the same, and configuring a packet. That is, data is encoded losslessly or at a high bit rate in a strong electric field situation providing a good network environment, and data is encoded at a low bit rate in a weak electric field situation providing a bad network environment. In this manner, data is seamlessly transmitted according to a channel situation.

Also, problems to be solved in some embodiments are to provide a method of effectively adjusting latency according to a media type (audio or video) so that latency is minimized in the case of data whose synchronization is important, and otherwise, robustness to an error is increased.

Also, problems to be solved in some embodiments are to provide a frame error concealment method and apparatus requiring no additional latency due to low complexity by utilizing an error concealment method using a previous good frame upon occurrence of an error frame. To this end, a reduction in sound quality is minimized by minimizing discontinuity and phase mismatch between frames that occur upon error concealment.

Also, some embodiments may provide a method and apparatus capable of reducing power consumption of a device when audio data is transmitted between devices connected through a wireless communication network.

Also, some embodiments provide a method and apparatus capable of managing and synchronizing a memory to which audio frames are stored by devices that transmit and receive audio data.

Also, some embodiments provide a method and apparatus capable of selectively transmitting an audio frame and an identification value of the audio frame.

Technical Solution

As technical means for achieving the above technical objects, a first aspect of the present disclosure may provide a first device, which provides an audio signal to a second device, the first device including: a memory that stores at least one previous audio frame; a control unit that divides an audio signal input to the first device into a plurality of audio frames, compares a current audio frame among the plurality of audio frames with the at least one previous audio frame prestored in the memory of the first device, and selects one of the prestored previous audio frames based on similarity of the prestored previous audio frame and the current audio frame; and a communication unit that transmits an identification value of the selected previous audio frame to the second device.

Also, when the similarity of the prestored previous audio frame and the current audio frame is greater than a preset threshold, the control unit may select one of the prestored previous audio frames.

Also, when the similarity of the prestored previous audio frame and the current audio frame is less than a preset threshold, the control unit may compress the current audio frame, and the communication unit may transmit the compressed current audio frame to the second device.

Also, when the compressed current audio frame is successfully transmitted to the second device, the control unit may delete at least one of the prestored previous audio frames, and when the at least one of the prestored previous audio frames is deleted, the control unit may store the current audio frame in the memory.

Also, the control unit may delete a previous audio frame stored earlier in the memory among the prestored previous audio frames.

Also, the control unit may delete one of the prestored previous audio frames based on a number of times the identification value of the prestored previous audio frame was transmitted to the second device.

Also, when the transmission of the identification value of the selected previous audio frame is failed, the communication unit may retransmit the identification value of the selected previous audio frame to the second device within a preset transmission time limit.

Also, when the retransmission of the identification value of the selected previous audio frame is failed within the preset transmission time limit, the control unit may determine a next audio frame transmission method.

Also, a second aspect of the present disclosure may provide a method by which a first device provides an audio signal to a second device, the method including: dividing an audio signal input to the first device into a plurality of audio frames; comparing a current audio frame among the plurality of audio frames with the at least one previous audio frame prestored in a memory of the first device; selecting one of the prestored previous audio frames based on similarity of the prestored previous audio frame and the current audio frame; and transmitting an identification value of the selected previous audio frame to the second device.

Also, when the selected previous audio frame is successfully transmitted to the second device, the selected previous audio frame may be stored in the memory and a memory of the second device.

Also, wherein the selecting of the prestored previous audio frames may include selecting one of the prestored previous audio frames when the similarity of the prestored previous audio frame and the current audio frame is greater than a preset threshold.

Also, the method may further include: when the similarity of the prestored previous audio frame and the current audio frame is less than a preset threshold, compressing the current audio frame; and transmitting the compressed current audio frame to the second device.

Also, the method may further include: when the compressed current audio frame is successfully transmitted to the second device, deleting at least one of the prestored previous audio frames; and when the at least one of the prestored previous audio frames is deleted, storing the current audio frame in the memory.

Also, the deleting of one of the prestored previous audio frames may include deleting a previous audio frame stored earlier in the memory among the prestored previous audio frames.

Also, the deleting of one of the prestored previous audio frames may include deleting one of the prestored previous audio frames based on a number of times the identification value of the prestored previous audio frame was transmitted to the second device.

Also, the method may further include, when the transmission of the identification value of the selected previous audio frame is failed, retransmitting the identification value of the selected previous audio frame to the second device within a preset transmission time limit.

Also, the method may further include, when the retransmission of the identification value of the selected previous audio frame is failed within the preset transmission time limit, determining a next audio frame transmission method.

Also, a third aspect of the present disclosure may provide a device, which receives an audio signal from another device, the device including: a communication unit that receives data related to an audio signal input to the other device from the other device; a control unit that determines a type of the received data, when the determined type of the data is an identification value of a prestored audio frame, extracts an audio frame corresponding to the identification value from a memory of the device, and when the determined type of the data is a bitstream of a current audio frame divided from the audio signal input to the other device, decompresses the bitstream into the current audio frame; and an output unit that outputs an audio signal of the extracted audio frame or an audio signal of the decompressed current audio frame.

Also, a fourth aspect of the present disclosure may provide a method by which a device receives an audio signal from another device, the method including: receiving data related to an audio signal input to the other device from the other device; determining a type of the received data; when the determined type of the data is an identification value of a prestored audio frame, extracting an audio frame corresponding to the identification value from a memory of the device; when the determined type of the data is a bitstream of a current audio frame divided from the audio signal input to the other device, decompressing the bitstream into the current audio frame; and outputting an audio signal of the extracted audio frame or an audio signal of the decompressed current audio frame.

Also, a fifth aspect of the present disclosure may provide a non-transitory computer-readable recording medium having recorded thereon a program for performing the method of the second aspect on a computer.

DESCRIPTION OF THE DRAWINGS

FIG. 4 is a diagram illustrating one embodiment of a method of adjusting a predetermined frame size and a predetermined number of frames so as to be optimized for a packet size.

MODE OF THE INVENTION

Advantages, features, and how to achieve them of the present invention will become apparent by reference to the embodiment that will be described later in detail, together with the accompanying drawings. The present invention may be embodied in many different forms and should not be construed as being limited to the embodiments set forth herein; rather, these embodiments of the present invention are provided so that this disclosure will be thorough and complete, and will fully convey the concept of the present invention to those skilled in the art. In the following description, detailed descriptions of well-known functions or configurations will be omitted since they would unnecessarily obscure the subject matters of the present invention.

The terms used in the present specification will be described briefly, and then, the present disclosure will be described in detail.

The terms used in this specification are those general terms currently widely used in the art in consideration of functions in regard to the inventive concept, but the terms may vary according to the intention of those of ordinary skill in the art, precedents, or new technology in the art. In addition, specified terms may be selected by the applicant, and in this case, the detailed meaning thereof will be described in the detailed description of the inventive concept. Thus, the terms used in the specification should be understood not as simple names but based on the meaning of the terms and the overall description of the inventive concept.

It will be further understood that the terms "comprises" and/or "comprising," when used in this specification, specify the presence of stated elements, but do not preclude the presence or addition of one or more other elements. As used herein, the term "unit" refers to a software component or a hardware component such as FPGA or ASIC, and the "unit" performs certain tasks. However, the "unit" should not be construed as being limited to software or hardware. The "unit" may be configured to reside on an addressable storage medium and be configured to execute one or more processors. Therefore, the "unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "units" may be combined into fewer components and units or be further separated into additional components and "units".

Hereinafter, exemplary embodiments will be described with reference to the accompanying drawings in such a manner that they may easily be carried out by a person with ordinary skill in the art to which the present invention pertains. For clarity of description, certain components not pertinent to the exemplary embodiments are omitted.

Figure 1:
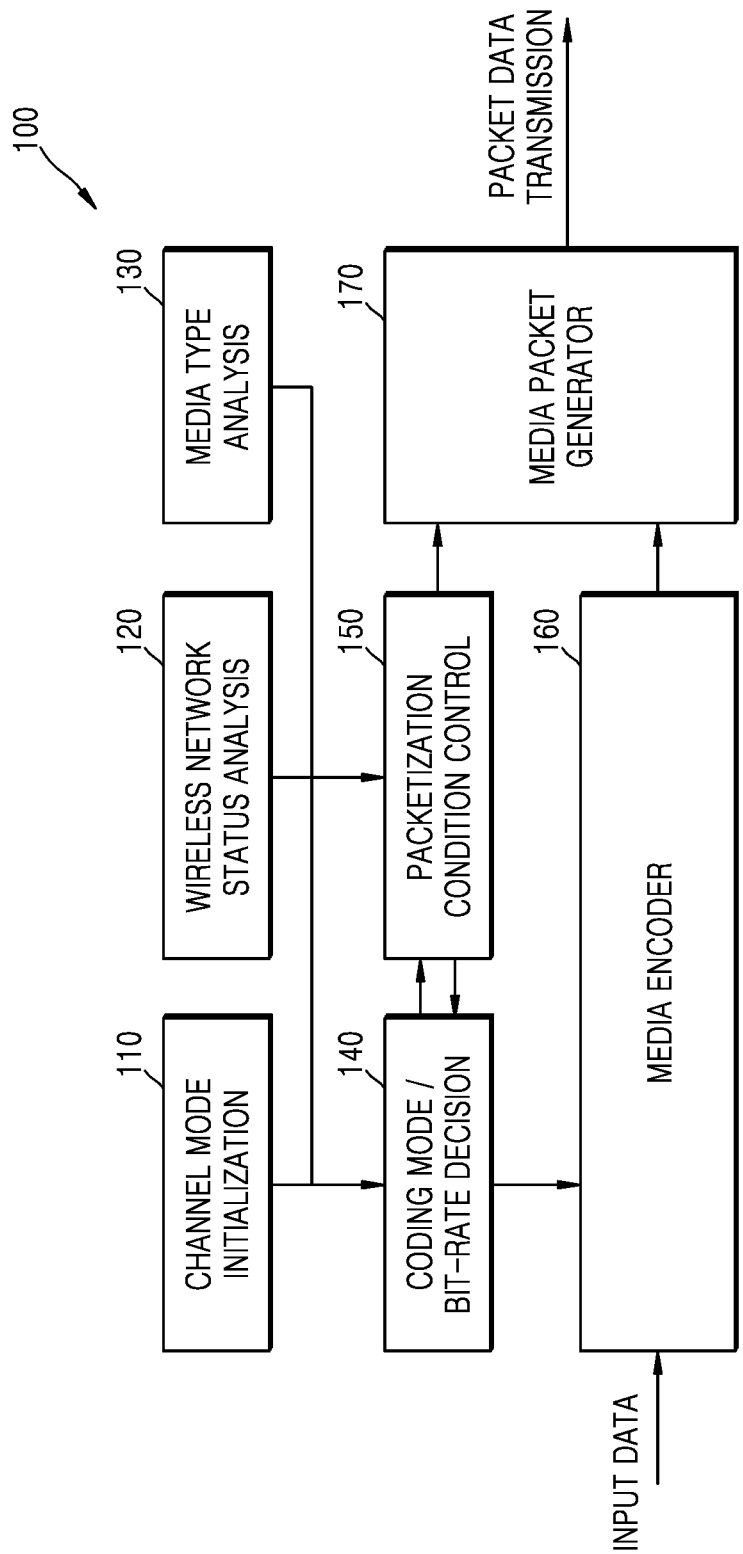
FIG. 1 is a schematic block diagram of a data transmission apparatus that controls a bit rate and latency according to a wireless network situation and configures a packet to be transmitted, according to some embodiments.

FIG. 1 is a schematic block diagram of a data transmission apparatus that controls a bit rate and latency according to a wireless network situation and configures a packet to be transmitted, according to some embodiments. The block diagram of FIG. 1 may be used in describing a data transmission method as well as the data transmission apparatus.

Referring to FIG. 1, the data transmission apparatus 100 includes a channel mode initialization module 110, a wireless network status analysis module 120, a media type analysis module 130, a coding mode/bit-rate decision module 140, a packetization condition control module 150, a media encoder module 160, and a media packet generator module 170. The "module" may also be referred to as "unit". For example, the channel mode initialization module 110 may be referred to as a channel mode initialization unit 110. The same applies to reference numerals 120 to 170. Also, the media encoder module 160 may be referred to as a media encoder 160. The media packet generator module 170 may be referred to as a media packet generator 170. In describing the data transmission method by using the block diagram of FIG. 1, the "module" may be referred to as "operation". For example, the channel mode initialization module 110 may be referred to as a channel mode initialization operation 110. The same applies to reference numerals 120 to 170.

The channel mode initialization (or initial channel mode) module 110 sets a channel mode of a network, determines a packet size according to the set channel mode, and set a bit rate of data encoded according to the determined size and the number of encoded data frames to be inserted into a packet. As an embodiment, in the case of Bluetooth, various modes are supported according to an error processing level and a packet configuration. Among them, in the case of an enhanced data rate (EDR) mode, a data transmission rate of up to 2.1 Mbps is possible in an asymmetric mode, and in the case of a basic rate (BR) mode, a transmission of up to 723.2 kpbs is possible in an asymmetric mode. Therefore, the packet size is determined according to a transmission rate supported by a selected channel. When the packet size is determined, the number of frames insertable into the packet and a size of each frame are determined for each bit rate supportable in a media codec. Equation 1 is one example of a method of determining the number of frames (frame num) to be inserted into one packet according to the determined packet size. In this case, the frame size is determined according to the bit rate supportable in the media codec. A round( ) function is a rounding-off function. For example, the number of frames (frame num) may round off to the nearest whole number.

$$\text{frame num} = \text{round}\left(\frac{\text{packet size}}{\text{frame size}}\right) \quad \langle\text{Equation 1}\rangle$$

Figure 2:
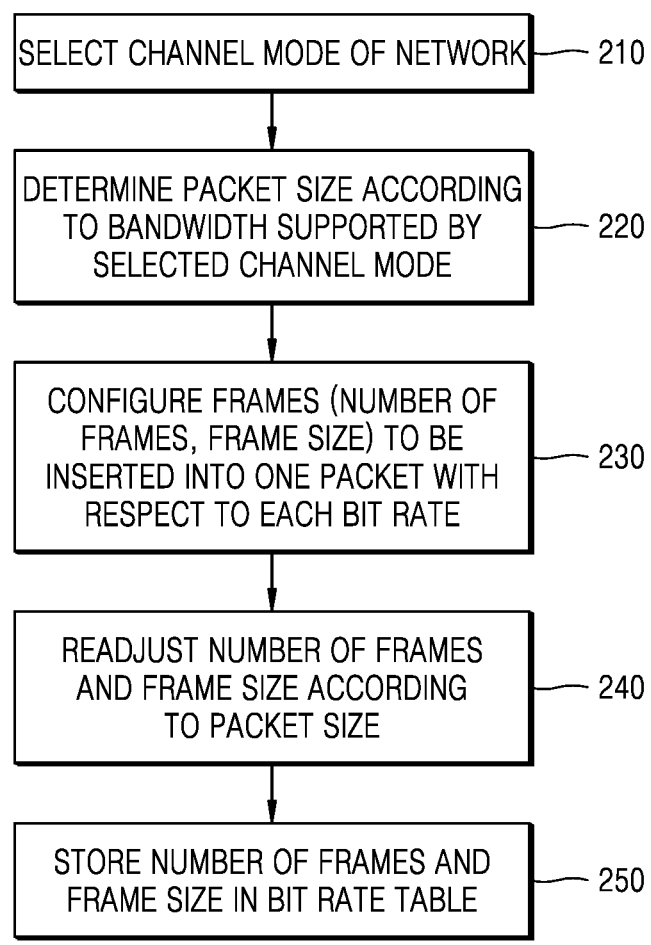
FIG. 2 is a flowchart of a method of determining a packet size, the number of frames, and a frame size according to a network channel, according to some embodiments.

FIG. 2 is a flowchart of a method of determining a packet size, the number of frames, and a frame size according to a network channel, according to some embodiments.

In operation 210, a channel mode of a network is selected.

In operation 220, a packet size is determined according to a bandwidth supported by the selected channel mode.

In operation 230, frames to be inserted into one packet according to the packet size determined in operation 220 are configured with respect to each bit rate. Specifically, the number of data frames to be inserted into the packet and a frame size are set.

In operation 240, the number of frames and the frame size are readjusted according to the packet size. The readjustment of the number of frames and the frame size will be described in detail with reference to FIG. 4.

In operation 250, the determined number of frames and the determined frame size are stored in a bit rate table.

The above-described method of FIG. 2 may be performed by a data transmission apparatus, a processor, or the like and may be performed by, for example, the channel mode initialization module 110.

Figure 3:
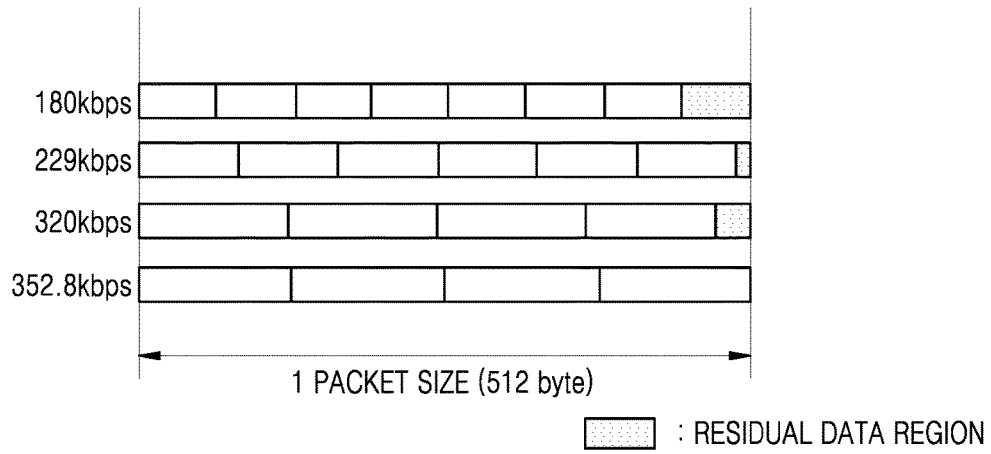
FIG. 3 is a diagram illustrating one embodiment of a method of determining a packet size, the number of frames, and a frame size according to a network channel, according to some embodiments.

FIG. 3 is a diagram illustrating one embodiment of a method of determining a packet size, the number of frames, and a frame size according to a network channel, according to some embodiments.

Some embodiments of FIG. 3 show the frame size and the number of frames, which are determined when the packet size is 512 bytes and the bit rate supportable in the media codec is 180/229/320/352.8 kbps. In this case, an amount of data determined according to each bit rate may be larger or smaller than the packet size determined according to the channel mode of the network.

FIG. 4 is a diagram illustrating one embodiment of a method of adjusting a predetermined frame size and a predetermined number of frames so as to be optimized for a packet size. FIG. 4 may be one embodiment describing the process performed in operation 240 of FIG. 2 in detail.

As illustrated in FIG. 4, when the amount of data of encoded frame data is smaller than the packet size, an empty space as much, for example, a residual data region (R), is generated. Data as much cannot be transmitted, and thus, a data space is wasted. In order to prevent occurrence of such inefficiency, the number of encoded data frames, the frame size, and the bit rate are adjusted to match the packet size. When the frame size is L, the number of frames within one packet is K, and the size of the residual data region is R, a length L' of an adjusted frame may be L+R/K. In addition to the adjustment of the frame size, the number of frames and the bit rate may also be adjusted.

Also, when the amount of encoded frame data exceeds the packet size, for example, an excess data region R exists, an excess frame (frame 5 in FIG. 4) is excluded, or an encoded frame is segmented and transmitted in a next packet. In this case, when data is decoded in a receiving end, a delay corresponding to one packet occurs. Thus, the number of frames, the frame size, and the bit rate are adjusted so that the encoded frame is not fragmented. When the frame size is L, the number of frames within one packet is K, and the size of the excess data region is R, a length L' of an adjusted frame may be L−R/K. In addition to the adjustment of the frame size, the number of frames and the bit rate may also be adjusted.

Information about the determined number of frames and the determined bit rate described above is transmitted to the coding mode/bit-rate decision module 140 as illustrated in FIG. 1.

According to another embodiment, the channel mode initialization module 110 may set a channel mode of a network, determine a packet size according to the set channel mode, and determine a lossy or lossless coding mode of multimedia data so as to match the determined packet size. Coding may include compression. For example, lossy coding may include lossy compression. Also, lossless coding may include lossless compression. When a bandwidth of a selected network channel is a certain width or more, the channel mode initialization module 110 adds the number of frames and the frame size based on the lossless coding mode to the bit rate table.

Figure 5:
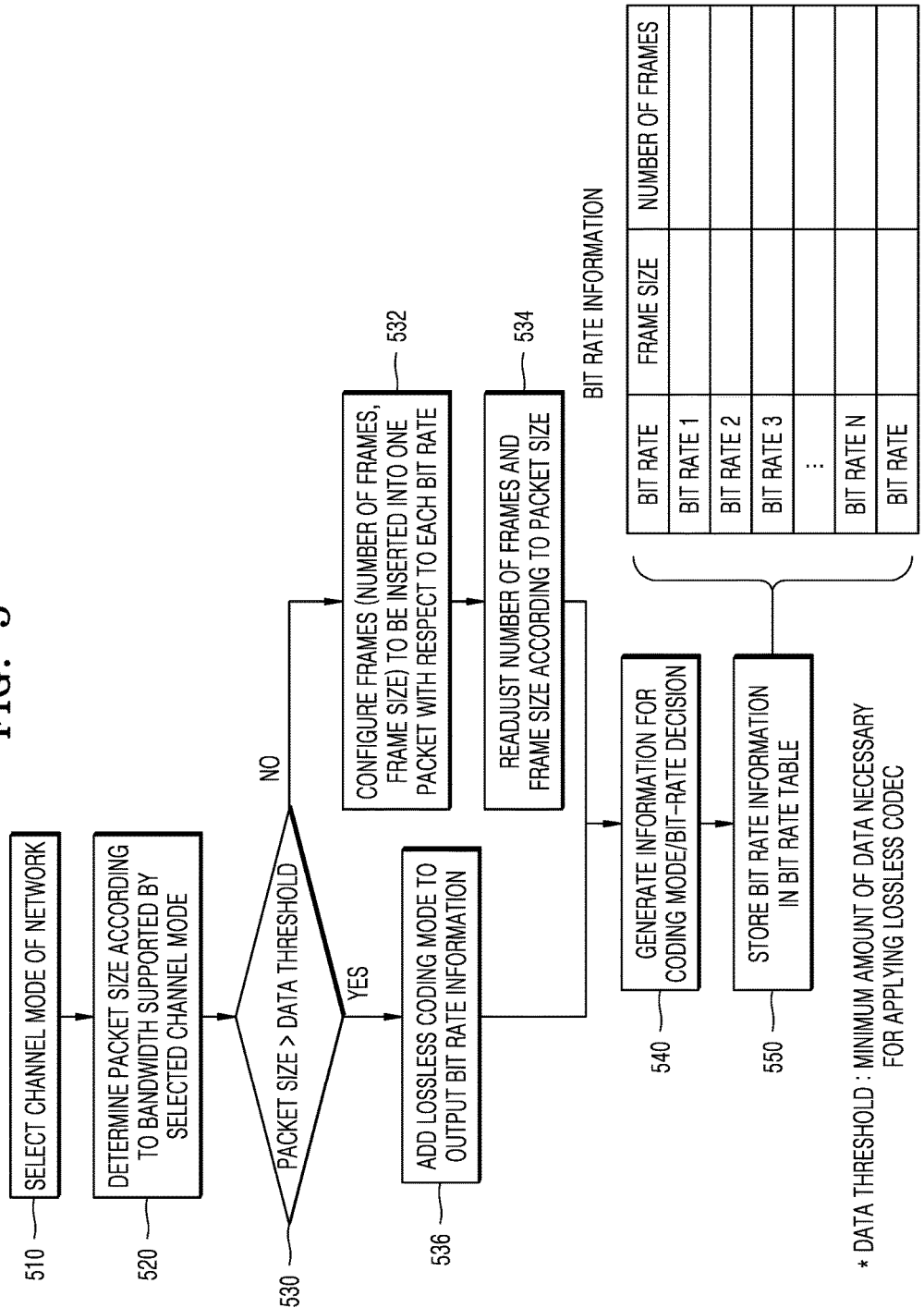
FIG. 5 is a flowchart of a method of determining a lossy or lossless mode, according to some embodiments.

FIG. 5 is a flowchart of a method of determining a lossy or lossless mode, according to some embodiments.

In operation 510, a channel mode of a network is selected.

In operation 520, a packet size is determined according to a bandwidth supported by the selected channel mode.

In operation 530, it is determined whether the packet size determined in operation 520 is larger than a data threshold. The data threshold is a minimum amount of data necessary for applying a lossless codec.

When it is determined in operation 530 that the packet size is not larger than the data threshold, the lossless codec cannot be applied. Therefore, in operation 532, frames to be inserted into one packet according to the packet size are configured with respect to each bit rate. Specifically, the number of data frames to be inserted into the packet and a frame size are set.

In operation 534, the number of frames and the frame size are readjusted according to the packet size. The readjustment of the number of frames and the frame size has been described with reference to FIG. 4.

When it is determined in operation 530 that the packet size is larger than the data threshold, the lossless codec can be applied. Therefore, in operation 536, a lossless coding mode is added to output bit rate information.

In operation 540, information for the coding mode and bit-rate decision is generated.

In operation 550, the bit rate information is stored in the bit rate table. As illustrated in FIG. 5, the table storing the bit rate information stores information about the frame size and the number of frames according to the bit rates 1, 2, . . . , N or the lossless coding mode.

The above-described method of FIG. 5 may be performed by a data transmission apparatus, a processor, or the like and may be performed by, for example, the channel mode initialization module 110 and the coding mode/bit-rate decision module 140 of FIG. 1.

The table associated with the coding mode, the frame size, and the number of frames may be used to determine a coding method of a media encoder in the coding mode/bit-rate decision module 140.

The wireless network status analysis module 120 of FIG. 1 analyzes information about the wireless network environment. A representative example of the information used herein includes receiver signal strength index (RSSI), link quality indicator (LQI), adaptive frequency hopping (AFH) channel masking information, and the like. The RSSI indicates the strength of the received signal. The LQI is a parameter indicating the quality of a connected communication state and is a value expressing a bit error rate (BER) with an integer of 0 to 255. The AFH is a hopping method used in Bluetooth. The AFH randomly hops available 79 channels and masks unavailable channels. When the network environment is good, the number of masking channels is small. However, when interference is severe, the number of masking channels increases. When a plurality of wireless networks coexist, the above-described parameters may be used to check a network situation occurring due to the influence of interference between channels or a diffraction of obstacles, walls, or the like. Also, information about the number of wireless peripheral devices using the same network is used. In a case where the peripheral devices use the same network, as the number of devices increases, an available bandwidth for each device is reduced and a bit rate is reduced. The information indicating the channel status is transmitted to the bit-rate decision module 140 and used to decide the bit rate.

The coding mode/bit-rate decision module 140 of FIG. 1 selects a bit rate of the media encoder by using the network status parameter analyzed by the wireless network status analysis module 120.

Figure 6:
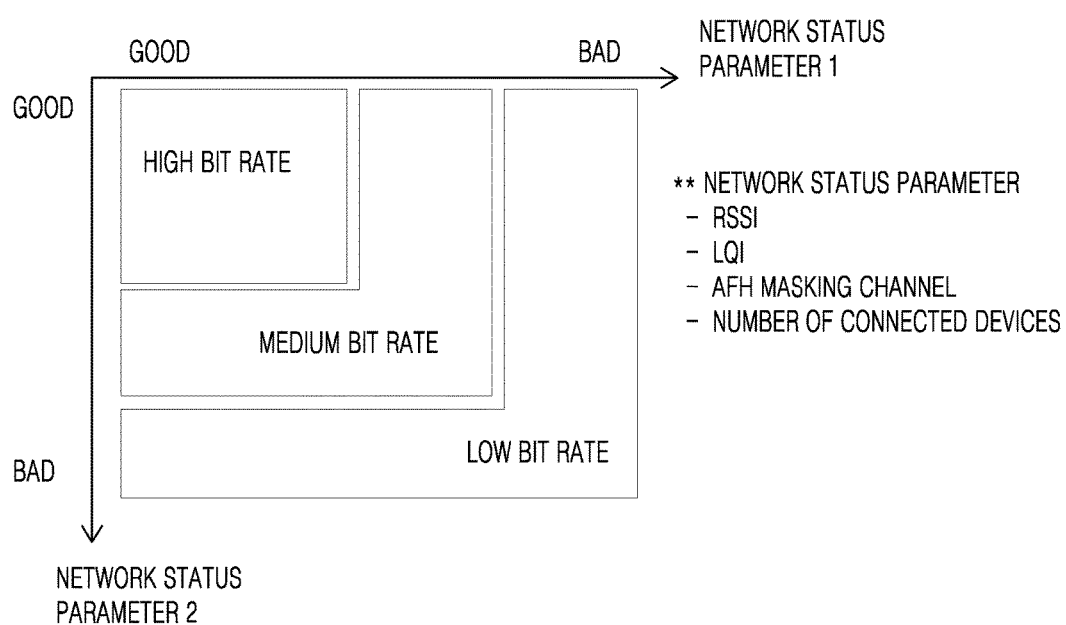
FIG. 6 is a diagram illustrating a relationship between quality of a plurality of network status parameters and a set bit rate.

FIG. 6 is a diagram illustrating a relationship between quality of a plurality of network status parameters and a set bit rate. The setting of the bit rate according to the network status parameter may be performed by, for example, the coding mode/bit-rate decision module 140 of FIG. 1.

As illustrated in FIG. 6, the bit rate is decided by a combination of two or more transmitted network status parameters. A plurality of parameters are analyzed. As the values of all parameters are better, the network environment is determined as a stronger electric field and a high bit rate is selected. On the contrary, when the value of the compared network status parameter is bad, the network environment is determined as a weak electric field and a low bit rate is selected. In the case of the RSSI, as the strength of the received signal is stronger, it may be determined as a good value. The LQI is a parameter indicating the quality of the connected communication state, and the quality may be determined according to the BER. In the case of the AFH masking channel, as the number of masking channels is smaller, it may be determined as a good value. In the case of the number of connected devices, as the number of devices is smaller, it may be determined as a good value.

The information about the selected bit rate is transmitted to the media encoder module 160, and the media encoder module 160 encodes input data according to the selected bit rate.

According to another embodiment, the coding mode/bit-rate decision module 140 may analyze the network channel environment by using the network status parameter and select the lossy or lossless coding mode according to the result of the analyzing. When the analyzed network channel is a strong electric field and the lossless coding is supportable in the channel mode, the coding mode/bit-rate decision module 140 selects the lossless coding and transmits this information to the media encoder module 160. When the lossless coding is not supported, a higher bit rate is selected as the network status is analyzed as being a stronger electric field and a lower bit rate is selected as the network status is analyzed as being a weaker electric field. Also, the information about the selected bit rate and the information about the number of frames and the frame size determined according to the bit rate are transmitted to the packetization condition control module 150 and used to generate a packet by using encoded frame data.

The media encoder module 160 encodes an input signal according to the input coding mode (lossy or lossless mode) and the decided bit rate and transmits the encoded data to the media packet generator module 170 so as to generate the packet.

Figure 7:
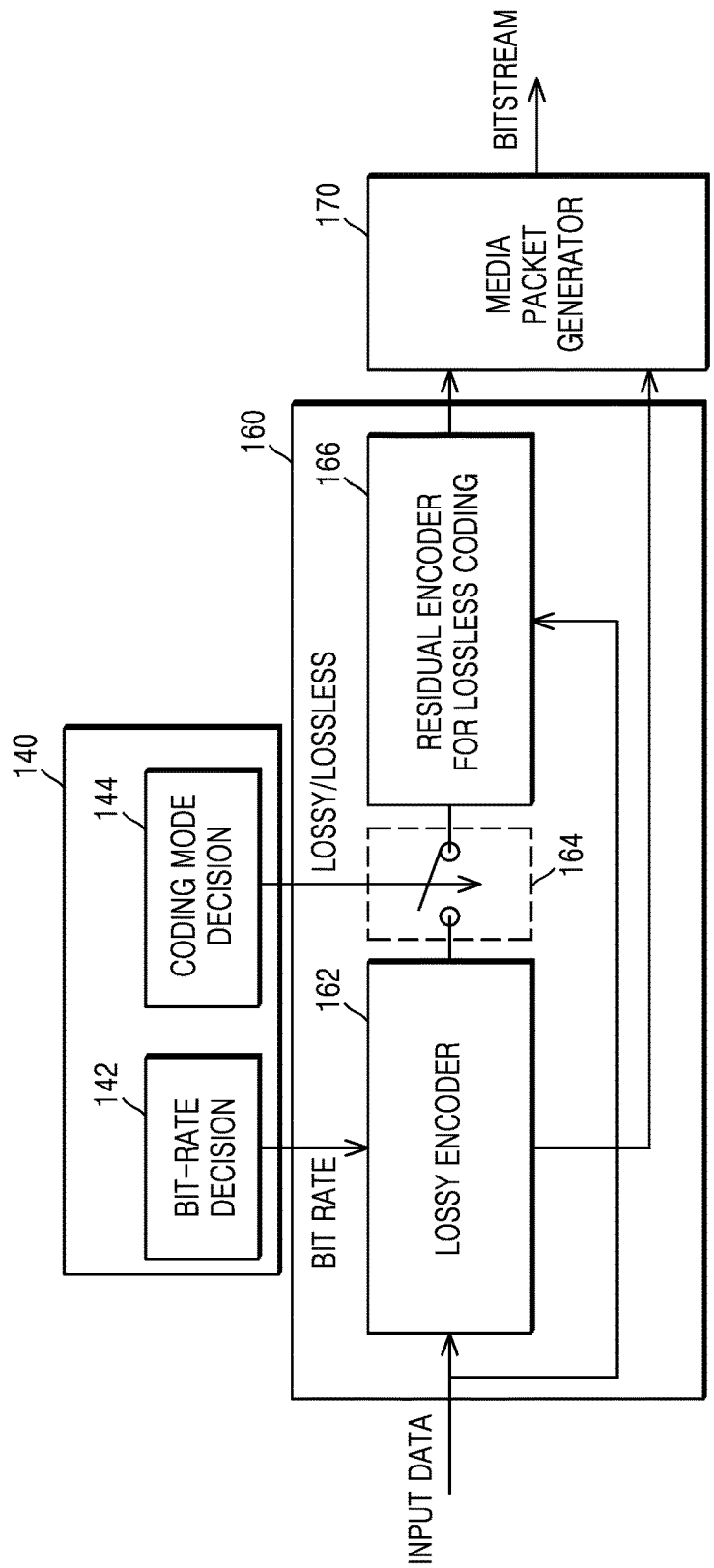
FIG. 7 is a detailed block diagram of a coding mode/bitrate decision module 140, a media encoder module 160, and a media packet generator module 170 in FIG. 1.

FIG. 7 is a detailed block diagram of the coding mode/bit-rate decision module 140, the media encoder module 160, and the media packet generator module 170 in FIG. 1. A method of operating the media encoder module 160 according to the coding mode and the bit rate will be described with reference to FIG. 7.

The coding mode/bit-rate decision module 140 may be divided into a bit-rate decision module 142 and a coding mode decision module 144.

The media encoder module 160 is divided into a lossy encoder module 162 that performs existing lossy encoding, and a residual encoder module 166 for lossless encoding, so as to maintain compatibility with an existing codec when an encoded bitstream is decoded in the receiving end. Therefore, the media encoder module 160 performs encoding by using the existing lossy encoder module 162 according to the input bit rate, and encodes extra data for the lossless coding through the residual encoder module 166 when the coding mode is the lossless coding. When the coding mode decision module 144 decides the lossy coding, the residual encoding is not performed by, for example, turning off a switch, and when the coding mode decision module 144 decides the lossless coding, the residual encoding is performed by, for example, turning on the switch 164.

The media packet generator module 170 generates the packet according to a predefined packet configuration method using the encoded bitstream.

Figure 8A:
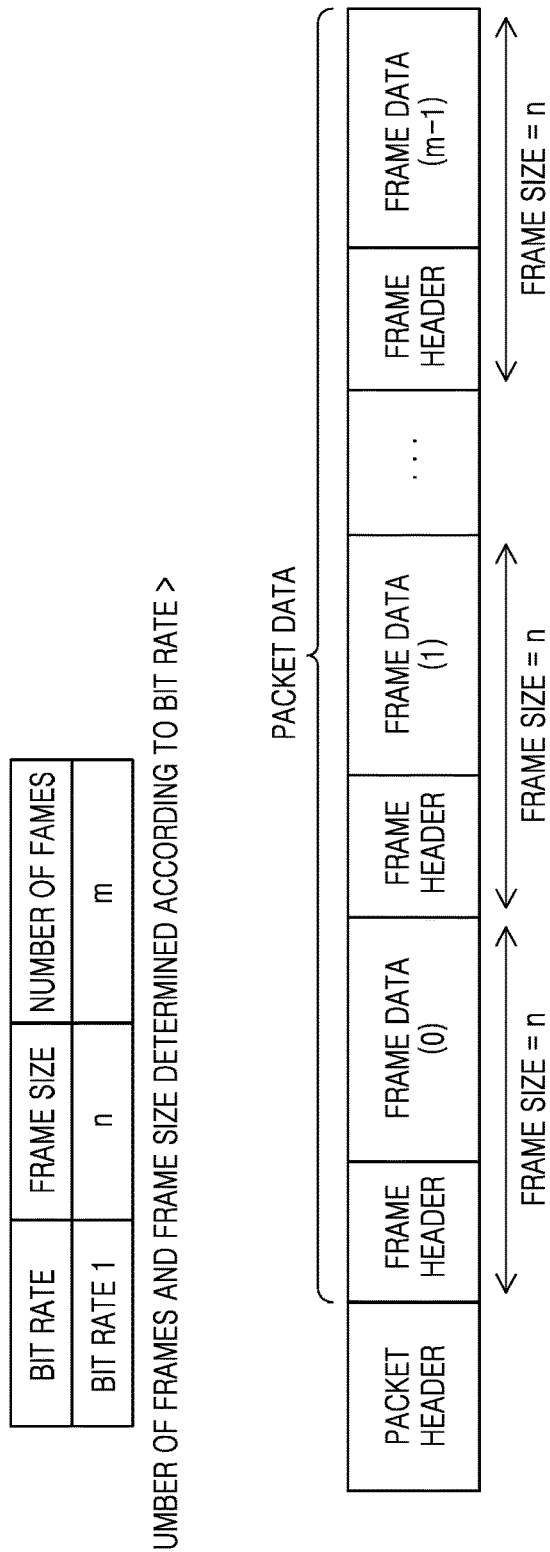
FIG. 8a is a diagram illustrating one embodiment of generating a packet according to the number of frames and a frame size predefined based on a channel mode and a bit rate.
Figure 8B:
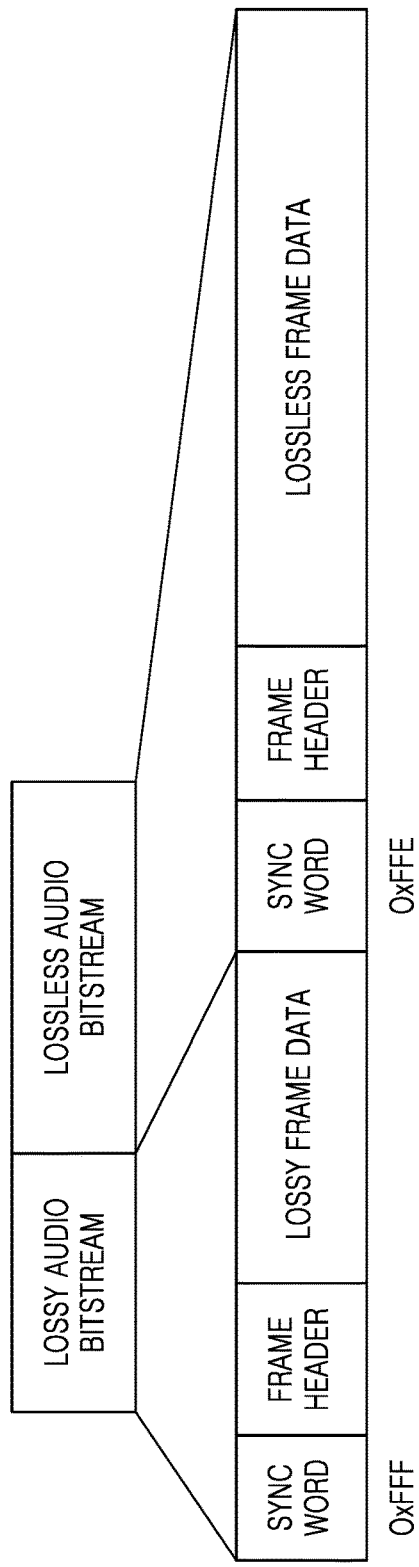
FIG. 8b is a diagram illustrating one embodiment of configuring a bitstream when input data is audio data and a coding mode is a lossless coding.

FIG. 8ba is a diagram illustrating one embodiment of generating a packet according to the number of frames and a frame size predefined based on a channel mode and a bit rate. Since the frame size and the number of frames are predefined according to the network channel situation and the packet size, the packet size is configured to minimize a portion in which an extra data space is left or exceeded. In the example of FIG. 8a, when the bit rate is 1, the frame size is determined to be n, the number of frames is determined to m, and packet data is configured to include m frames (frame 0 to frame m−1).

FIG. 8b is a diagram illustrating one embodiment of configuring a bitstream when input data is audio data and the coding mode is the lossless coding. The lossless coding must be designed by taking into account compatibility with an existing encoder. That is, the lossy coding is performed on the input data by using the lossy encoder module 162, and extra data for the lossless coding is separately encoded and then added to the bitstream. In this way, even when the lossless coding is not supported, a decoder may decode a lossy-encoded region by using an existing decoder alone and may skip a lossless-encoded region. Information for distinguishing the lossy-encoded region from the lossless-encoded region may be included in the bitstream. In the present embodiment, different syncword values are set to a lossy bitstream and a lossless bitstream so as to distinguish the lossless-encoded region in the bitstream.

The media type analysis module 130 of FIG. 1 selects a media type (audio or video) and a latency degree in a transmitting end.

Figure 9:
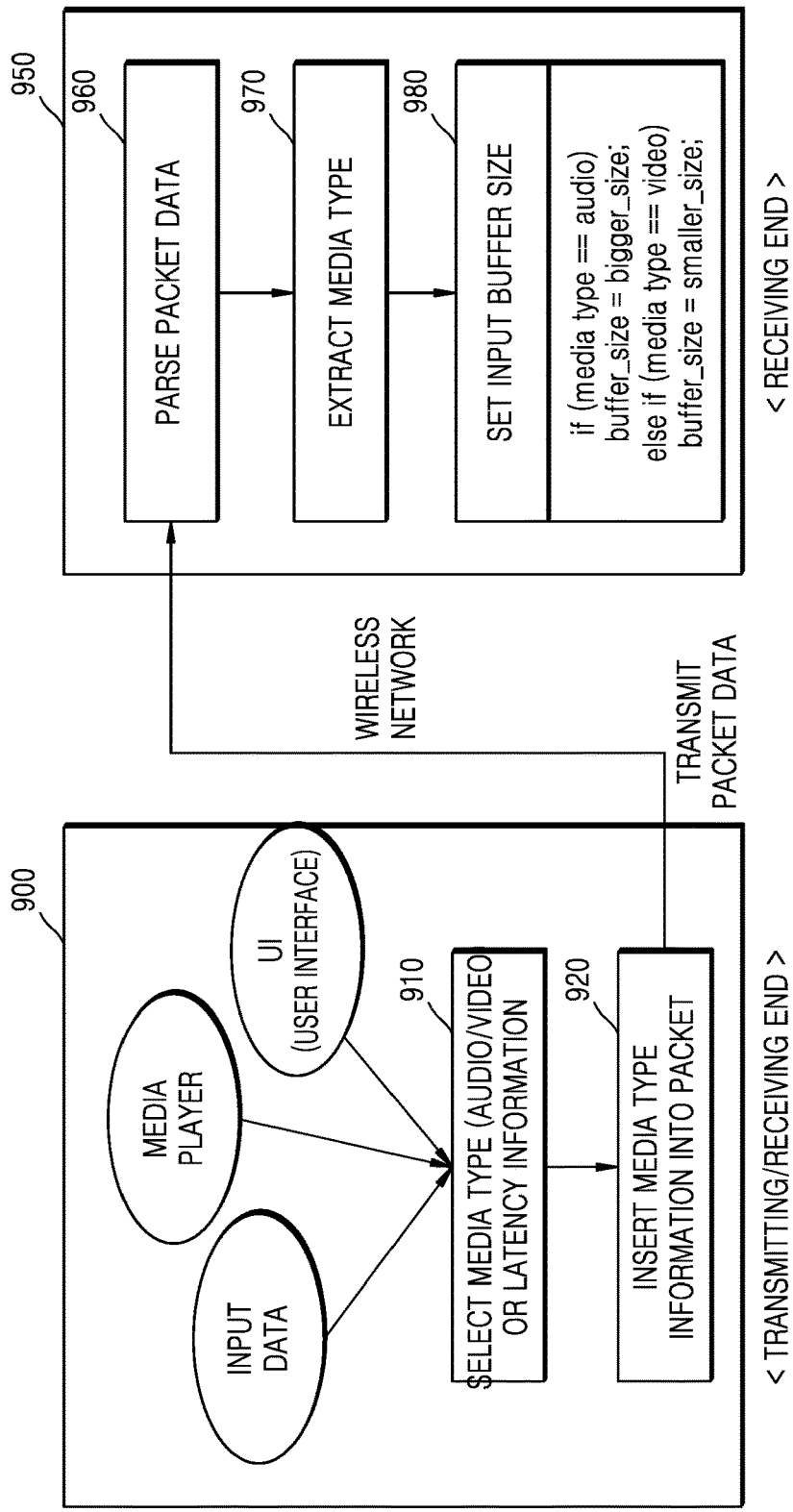
FIG. 9 is a diagram showing an input buffer control method of a receiving end 950 according to a media type.

FIG. 9 is a diagram showing an input buffer control method of a receiving end 950 according to a media type.

In operation 910 of FIG. 9, the media type may be determined by information of input data, metadata, and a media player, or a user may directly select a latency degree by using a user interface (UI). The selected media type is used to determine the latency of data to be transmitted. Generally, in the case of content such as video, no latency must be present because synchronization (sync) between audios or videos is very important. However, in the case of audio data, it does not matter even though slight latency occurs. Generally, when the input buffer of the receiving end is large, latency relatively increases. However, robustness to an error becomes strong. On the contrary, when the input buffer is small, latency less occurs, but the input buffer is vulnerable to an error. Therefore, the synchronization and the robustness can be appropriately adjusted by adjusting the size of the input buffer of the receiving end according to the input media type.

In operation 920, the media type information selected in operation 910 or the latency information is inserted into the packet and transmitted to the receiving end 950 in the wireless network environment.

In operation 960, the receiving end 950 parses packet data.

In operation 970, the receiving end 950 extracts the media type information or the latency information from the packet.

In operation 980, when it is determined from the extracted information that the type of the transmitted encoded data is audio, the receiving end 950 sets the buffer size to be large, and when it is determined that the type of the transmitted encoded data is audio data including video data, the receiving end sets the buffer size to be small.

The receiving end parses the packet transmitted from the transmitting end and transmits the media bitstream to the decoder.

Figure 10:
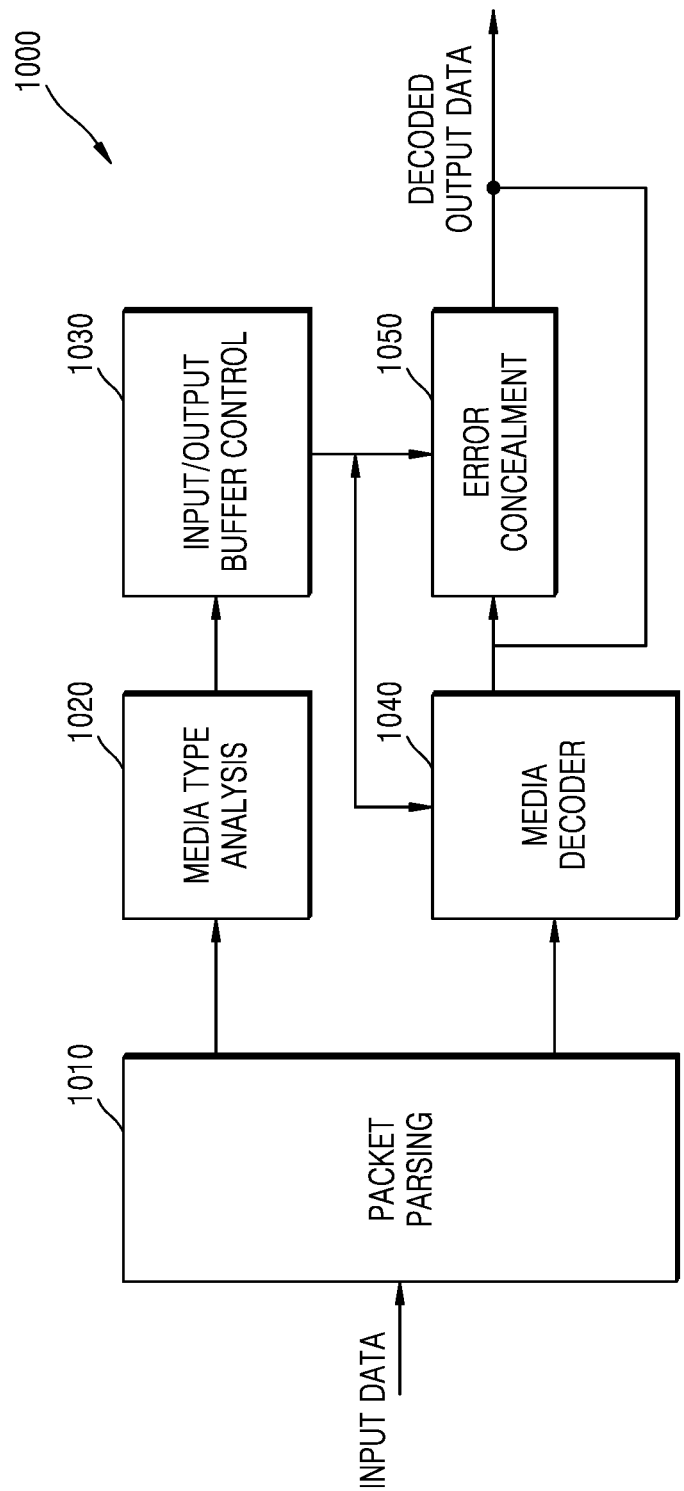
FIG. 10 is a schematic block diagram of a data reproduction apparatus 1000 that processes and decodes a packet input from a receiving end, according to some embodiments.

FIG. 10 is a schematic block diagram of a data reproduction apparatus 1000 that processes and decodes a packet input from a receiving end, according to some embodiments. The block diagram of FIG. 10 may be used in describing a data reproduction method as well as the data reproduction apparatus 1000.

Referring to FIG. 10, the data reproduction apparatus 1000 includes a packet parsing module 1010, a media type analysis module 1020, an input/output buffer control module 1030, a media decoder module 1040, and an error concealment module 1050. The "module" may also be referred to as "unit". For example, the packet parsing module 1010 may be referred to as a packet parsing unit 1010. The same applies to reference numerals 1020 to 1050. Also, the media decoder module 1040 may be referred to as a media decoder 1040. In describing the data reproduction method by using the block diagram of FIG. 10, the "module" may be referred to as "operation". For example, the packet parsing module 1010 may be referred to as a packet parsing operation 1010. The same applies to reference numerals 1020 to 1050.

The packet parsing module 1010 de-packetizes the input packet (reconfigures data from packets) and transmits the extracted bitstream to the media decoder module 1040. Also, the packet parsing module 1010 extracts the media type information or the latency information inserted into the packet, and transmits the media type information or the latency information to the media type analysis module 1020.

The media type analysis module 1020 analyzes the input media type and delay information.

The input/output buffer control module 1030 analyzes the size of the input buffer according to the media type (audio or video) and the latency information analyzed by the media type analysis module 1020.

The media decoder module 1040 decodes the media data by using the bitstream extracted by the packet parsing module 1010 and the input buffer having the size adjusted by the input/output buffer control module 1030.

The error concealment module 1050 recovers an error that occurs in some encoded frame signals when some packets are lost or distorted due to an error upon transmission in the process of transmitting the encoded audio signal through the wireless network. If the error occurring in the frame is not appropriately processed, the sound quality of the audio signal is degraded in a frame section where the error occurs. Thus, a decoding apparatus recovers a signal by using a data repetition method. In some embodiments, error concealment is performed in a time domain of the encoded audio data, without additional latency due to low complexity.

In some embodiments, as a basic method of error concealment, previous data is repeated by using previously decoded audio data for low complexity. The repeated audio data is used by storing the normal decoded data in the buffer having a certain length from the latest data and reading and repeating the data stored in the buffer.

Figure 11:
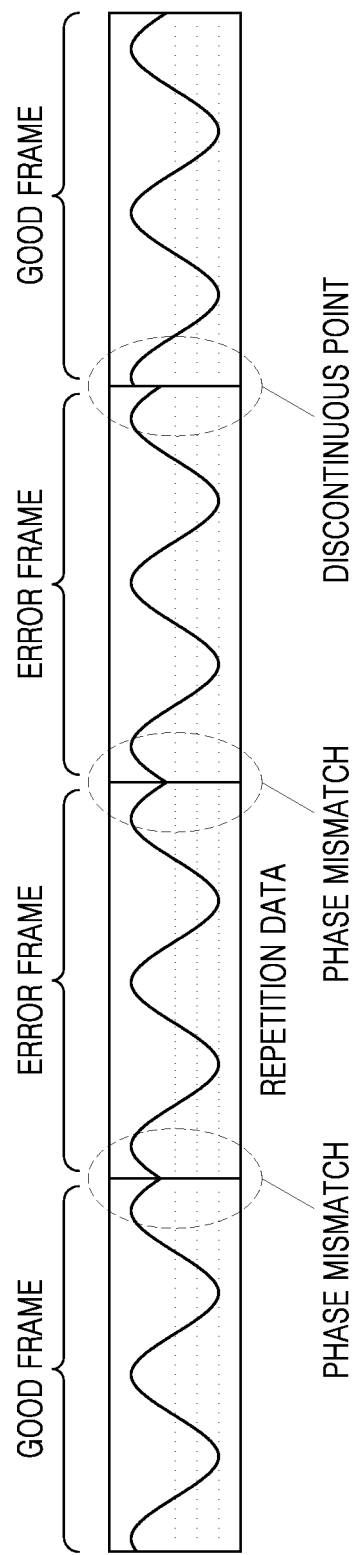
FIG. 11 is a diagram illustrating problems of phase mismatch or discontinuous point occurring upon existing simple data repetition.

FIG. 11 is a diagram illustrating problems of phase mismatch or discontinuous point occurring upon existing simple data repetition. The simple data repetition makes phase mismatch or discontinuous points at a boundary of data repeated as illustrated in FIG. 11, and these portions cause a degradation in the sound quality of the audio signal. Also, if an error frame is lengthened, the same data stored in the buffer is continuously repeated. In this case, the above problems also occur between the data repeated for error concealment. Therefore, in order to solve these problems, some embodiments modify audio data stored in the buffer used for reconstruction at a boundary between a good frame and an error frame and a boundary between an error frame and an error frame upon occurrence of error and apply the overlap and add method by using the modified audio data.

Figure 12:
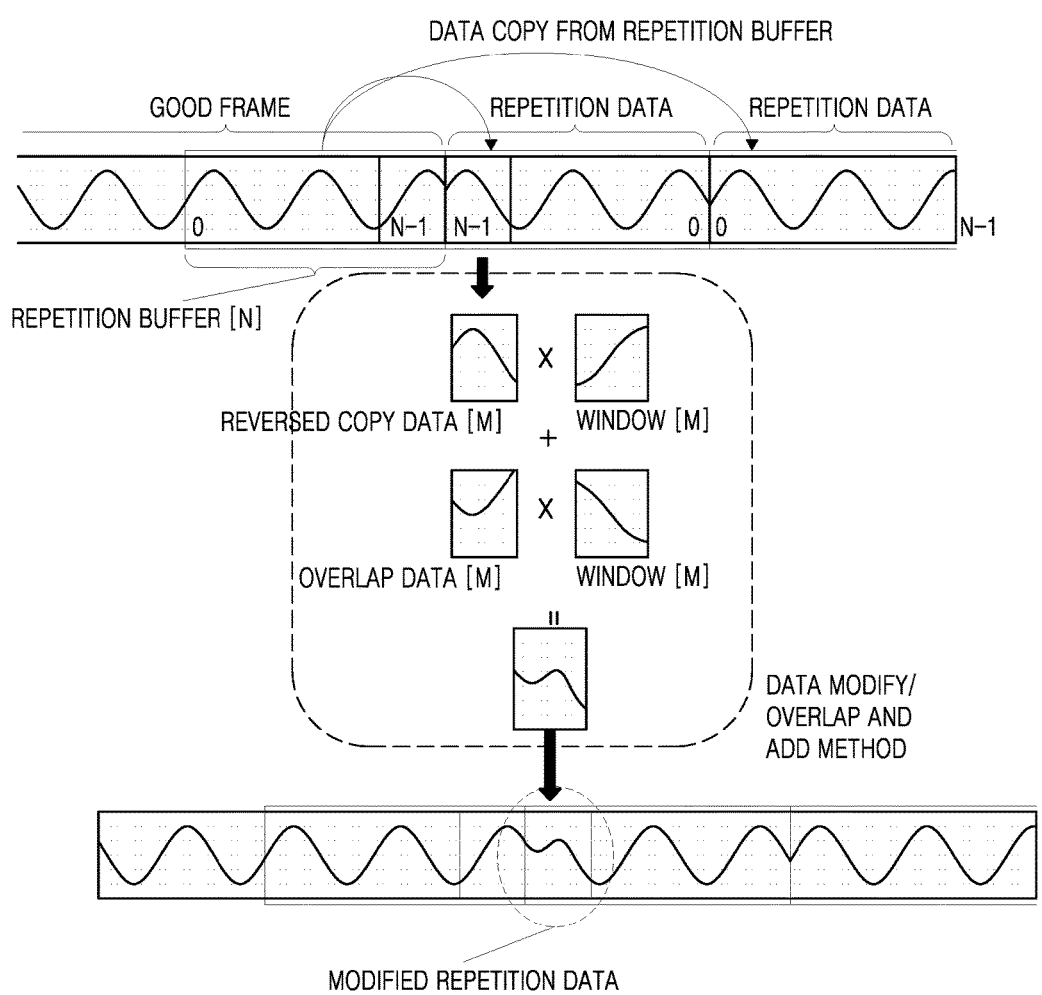
FIG. 12 is a diagram showing a process of applying an overlap and add method in the first error frame as one embodiment of a repetition data generation method used for error concealment.

FIG. 12 is a diagram showing a process of applying an overlap and add method in the first error frame as one embodiment of a repetition data generation method used for error concealment. A repetition buffer stores N audio data decoded in the latest normal operation. When the first error frame is generated, data copy starts from the latest data of the repetition buffer as many as the number of data to be repeated as expressed in Equation 2 below:

for ($i=0;i<$copy_data_num;$i$++,$k$++)

repetition data[$k$]==repetition_Buffer[$N-i$];   <Equation 2>

After the first error frame, data is sequentially coped as many as the number of data to be copied from the repetition buffer. When a read pointer of the buffer reaches the end of the buffer, data copy is performed in a reverse direction of the buffer as expressed in Equation 3 below. When the read pointer reaches both ends of the buffer, the above process is repeated to perform data copy.

for ($i=0;i<$copy_data_num;$i$++,$k$++)

repetition data[$k$]==repetition_Buffer[$i$];   <Equation 3>

The simple repetition during the data repetition causes the phase mismatch and the discontinuous point as described above. Therefore, when the first error frame starts, an overlap section having a certain length is made and data stored in the repetition buffer is modified so as to minimize the problem.

for ($i=0;i<M;i$++)

repetition_buffer$_{modified}$[$i$]=reversed$_{copy\_data[i]}$*win[$i$]+ overlap_data[$i$]*win[$M-1+i$]   <Equation 4>

Equation 4 represents the overlap and add method when the first error frame is generated. "reversed_copy_data" is a value of data copied from the repetition buffer. The coped data brings data of the overlap size M from the latest value (N−1) of the repetition buffer. "overlap_data" is a value overlapped for minimizing an error. "overlap_data" reverses the last value of the repetition buffer by using the data of the overlap size M from the latest value (N−1) of the repetition buffer as expressed in Equation 5.

<Equation 5> for (i = 0; i < M; i + +)
{
    overlap_data[i] = repetition_buffer[N −1] +
            (repetition_buffer[N −1] − repetition_buffer[N −1 −i]);
}

In some embodiments, the overlap window used a sin window as expressed in Equation 6 below:

$$\text{win}(n) = \sin^2\left(\frac{\pi(n + 0.5)}{2*M}\right), n = 0, \ldots\ldots\ldots, M-1 \quad \langle\text{Equation 6}\rangle$$

When the read pointer of the repetition buffer reaches both ends of the buffer during the data repetition, the data is copied in a reverse direction. In this case, problems such as the phase mismatch or the discontinuous point occur at the boundary of the buffer as described above.

Figure 13A:
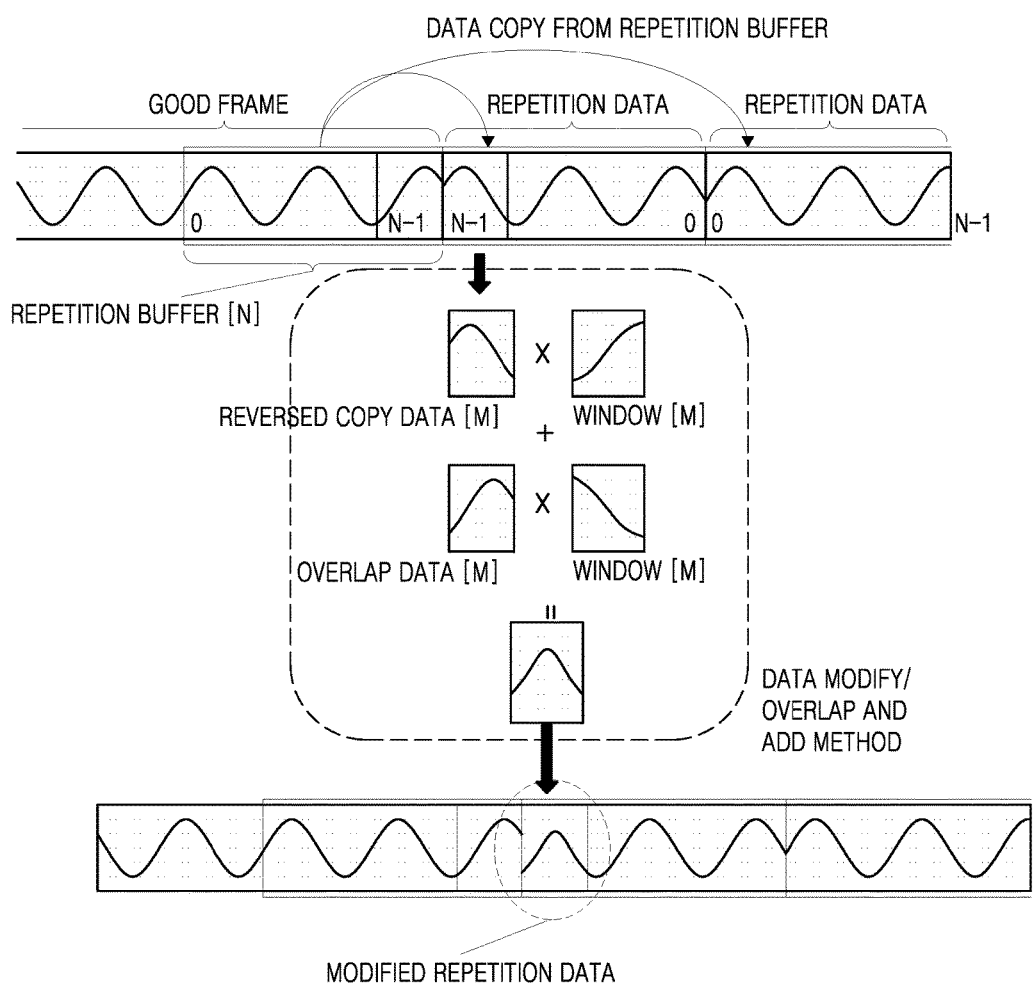
FIG. 13a is a diagram showing a process of applying an overlap and add method at one end of repetition data.
Figure 13B:
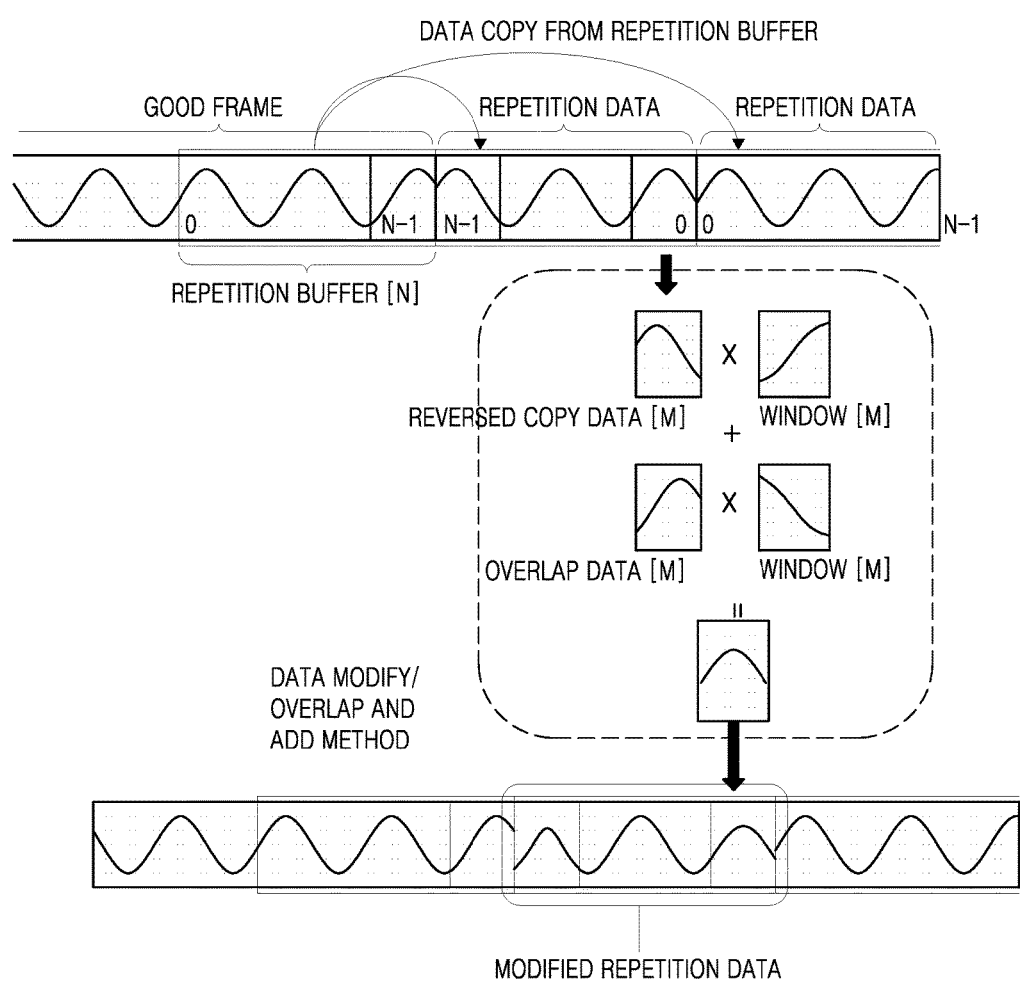
FIG. 13b is a diagram showing a process of applying an overlap and add method at another end of repetition data.

FIG. 13*a* is a diagram showing a process of applying an overlap and add method at one end of repetition data, and FIG. 13*b* is a diagram showing a process of applying an overlap and add method at another end of repetition data. Through the processes of FIGS. 13*a* and 13*b*, the modified repetition buffer is obtained as illustrated in FIG. 13*b*.

In FIG. 13*a*, problems occurring when the overlap and add process is performed by using the data of the repetition buffer is minimized. In this case, the reversed data is a value obtained by reversing the data of the repetition buffer referenced for overlap. The overlap data uses the value itself of the repetition buffer referenced for overlap.

As illustrated in FIGS. 13*a* and 13*b*, the repetition buffer is converted into a new repetition buffer by performing the overlap and add process at both ends of the buffer.

Figure 14:
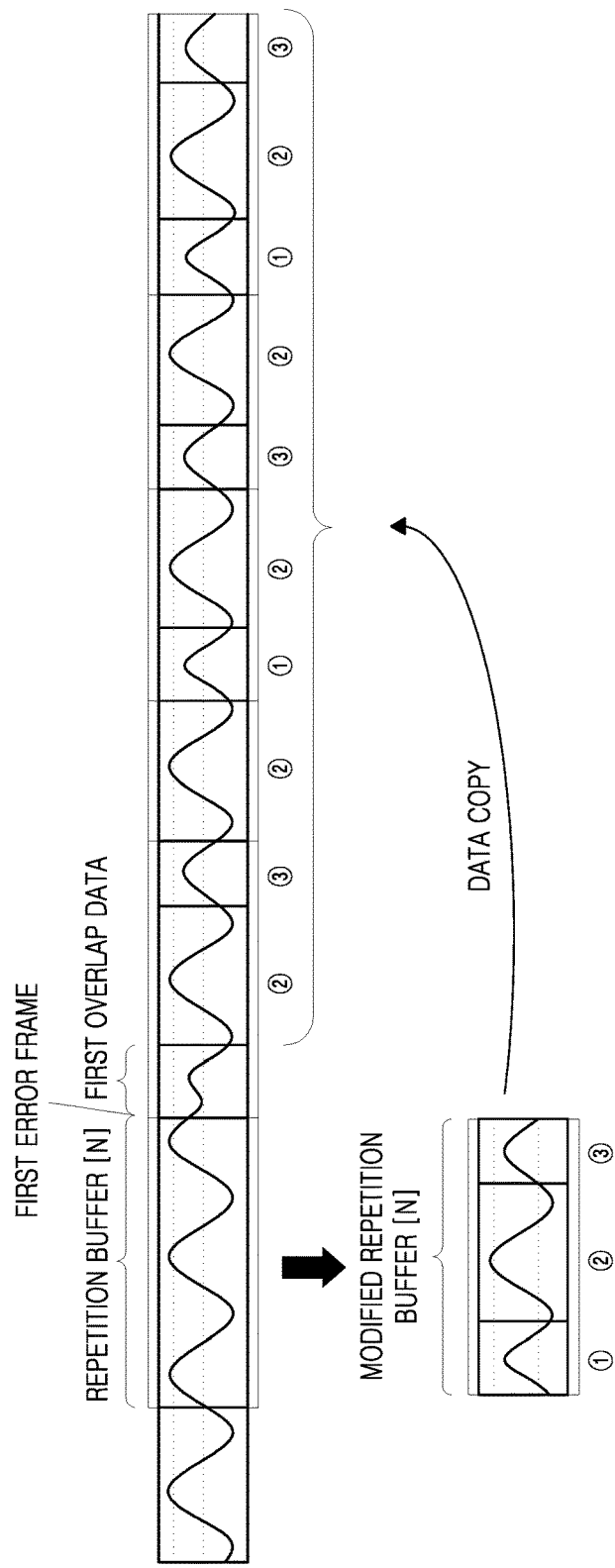
FIG. 14 is a diagram showing an error concealment method using a modified repetition buffer, according to some embodiments.

FIG. 14 is a diagram showing an error concealment method using a modified repetition buffer, according to some embodiments.

Once generated, the generated repetition buffer may be used in data replication for error concealment as illustrated in FIG. 14, without separate additional process. In this manner, the method proposed in some embodiments may reduce complexity of error concealment and minimize a degradation in sound quality.

If some embodiments are used, in the case of the strong electric field in which the channel environment of the wireless network is good, sound quality may be improved by encoding multimedia data losslessly or at a high bit rate, and in the case of the weak electric field in which the channel environment of the wireless network is bad, sound disconnection may be minimized by efficiently changing a bit rate from a low level to a high level according to the network channel environment.

Also, the lost frame may be reconstructed by applying a low-complexity error concealment method to the error frame occurring in the encoder due to packet loss or error, and a natural signal reconstruction may be achieved by minimizing the phase mismatch and the discontinuous point.

Also, if the present invention is used, the synchronization and latency can be effectively controlled according to the data type by adjusting the size of the input buffer of the receiving end according to the data type (audio or video).

Figure 15:
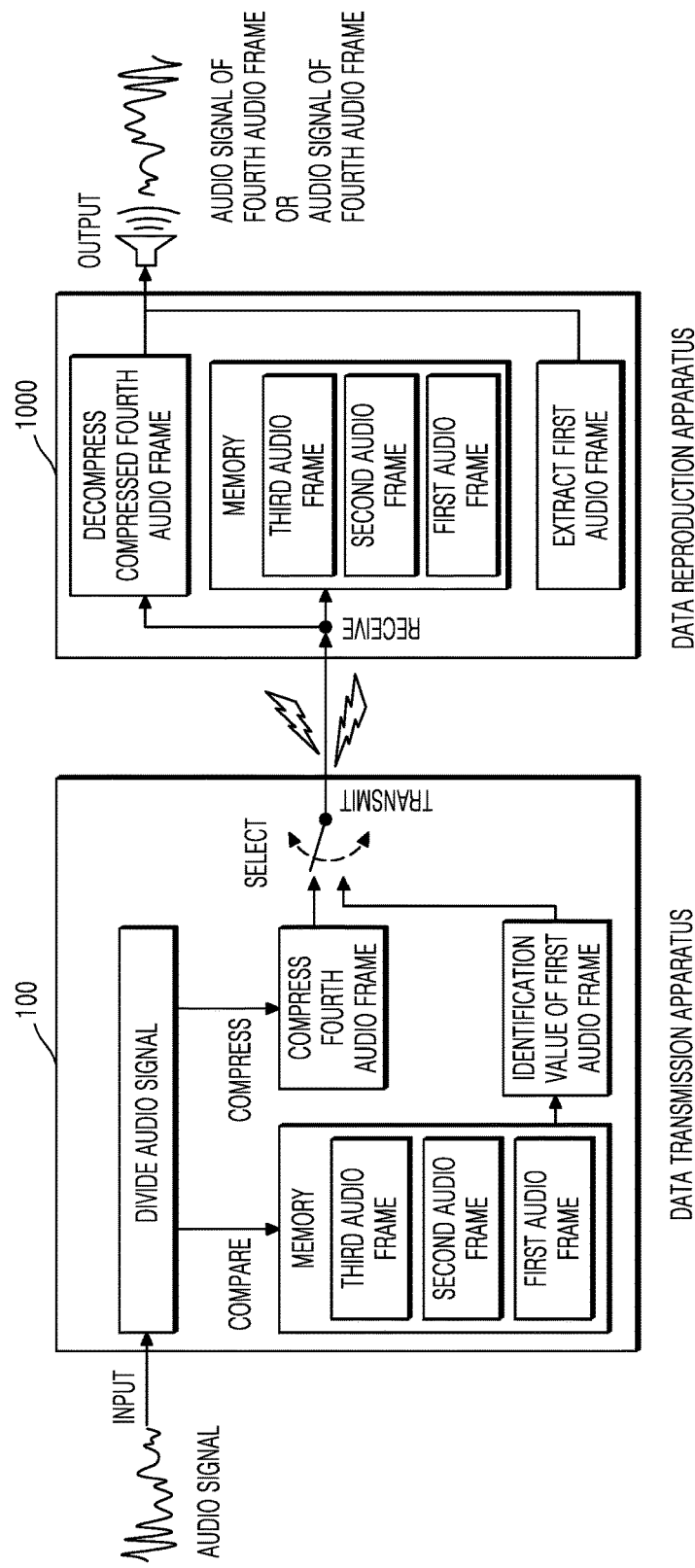
FIG. 15 is a diagram illustrating an example in which a data transmission apparatus 100 provides audio data to a data reproduction apparatus 1000, according to some embodiments.

FIG. 15 is a diagram illustrating an example in which a data transmission apparatus 100 provides audio data to a data reproduction apparatus 1000, according to some embodiments.

Referring to FIG. 15, the data transmission apparatus 100 according to some embodiments may selectively transmit an audio frame divided from an audio signal or an identification value of the audio frame to the data reproduction apparatus 1000. The data transmission apparatus 100 may divide an audio signal into a plurality of audio frames and may compare a fourth audio frame, which is a current audio frame, with a first audio frame, a second audio frame, and a third audio frame, which are previous audio frames stored in the data transmission apparatus 100. Also, based on the result of the comparing, the data transmission apparatus 100 may compress the fourth audio frame and transmit the compressed fourth audio frame to the data reproduction apparatus 1000, or may transmit an identification value of a previous audio frame similar to the fourth audio frame to the data reproduction apparatus 1000.

Also, the data reproduction apparatus 1000 may decompress the compressed fourth audio frame received from the data transmission apparatus 100 and output the decompressed fourth audio frame, or may extract the audio frame corresponding to the identification value received from the data transmission apparatus 100 from a memory of the data reproduction apparatus 1000 and output the extracted audio frame.

Figure 16:
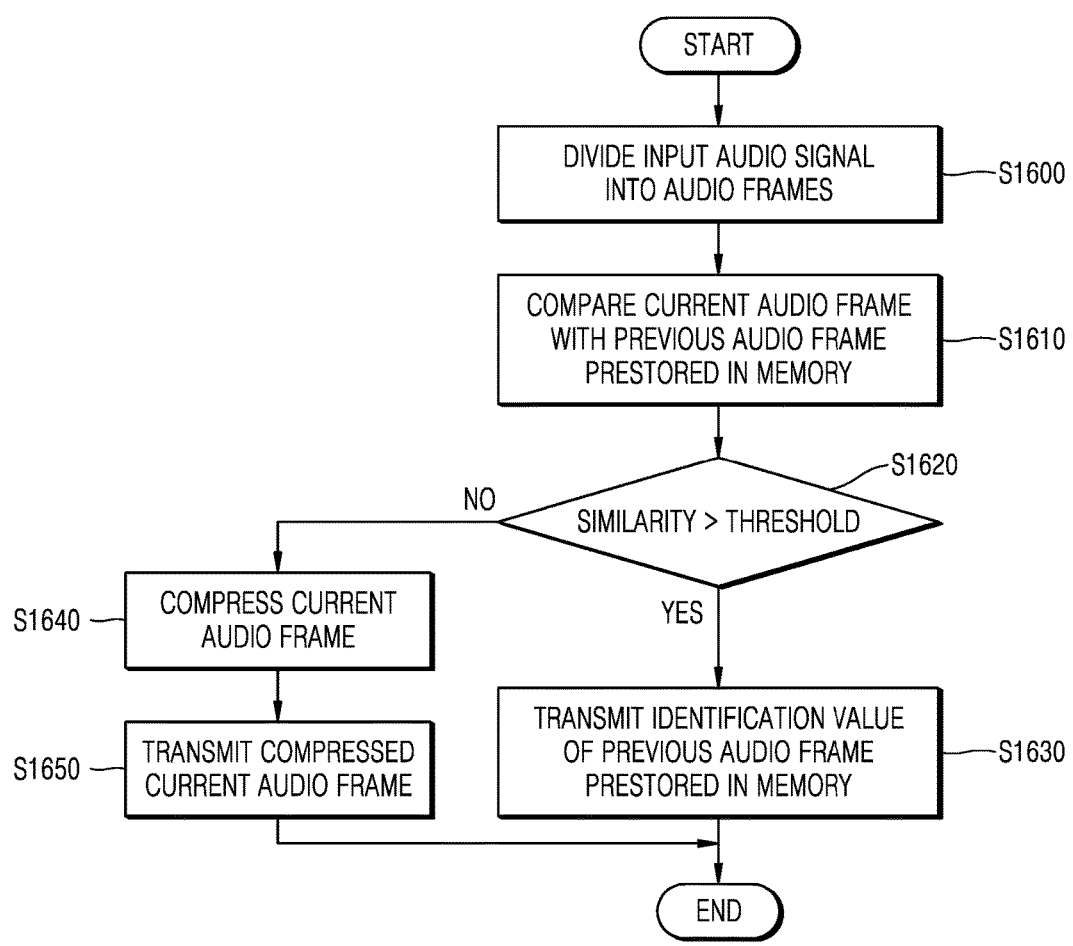
FIG. 16 is a flowchart of a method by which a data transmission apparatus 100 provides audio data to a data reproduction apparatus 1000, according to some embodiments.

FIG. 16 is a flowchart of a method by which a data transmission apparatus 100 provides audio data to a data reproduction apparatus 1000, according to some embodiments.

In operation S1600, the data transmission apparatus 100 may divide an input audio signal into a plurality of audio frames. The data transmission apparatus 100 may receive a voice input from a user or may receive an audio signal provided from another device (not illustrated). Also, when the audio signal received by the data transmission apparatus 100 is an analog signal, the data transmission apparatus 100 may convert the audio signal into a digital signal. Also, the data transmission apparatus 100 may divide the received audio signal into a plurality of audio frames. The data transmission apparatus 100 may continuously divide the audio signal over time.

In operation S1610, the data transmission apparatus 100 may compare the current audio frame with at least one audio frame prestored in a memory 1700 of the data transmission apparatus 100. The audio frame prestored in the memory 1700 may be an audio frame prior to the current audio frame. Also, the audio frame prestored in the memory 1700 may be a previous audio frame successfully transmitted to the data reproduction apparatus 1000.

The data transmission apparatus 100 may determine similarity of the previous audio frame and the current audio frame by comparing the previous audio frame prestored in the memory 1700 with the current audio frame. For example, the data transmission apparatus 100 may determine the similarity of the previous audio frame and the current audio frame by calculating a correlation value of the previous audio frame and the current audio frame. The correlation value of the previous audio frame and the current audio frame may be calculated by using mean square error (MSE) or the like. However, embodiments of the present disclosure are not limited thereto. The similarity of the previous audio frame and the current audio frame may be determined through various techniques.

In operation S1620, the data transmission apparatus 100 may determine whether the determined similarity is greater than a preset threshold. The preset threshold may be variously set according to, for example, a type of an audio signal, an audio signal division method, a specification of the data transmission apparatus 100, and a specification of the data reproduction apparatus 1000.

When it is determined in operation S1620 that the determined similarity is greater than the preset threshold, the data transmission apparatus 100 may transmit an identification value of the previous audio frame prestored in the memory 1700 to the data reproduction apparatus 1000 in operation S1630. The data transmission apparatus 100 may transmit the identification value of the previous audio frame having the determined similarity to the data reproduction apparatus 1000.

When there are a plurality of audio frames having similarities equal to or greater than the threshold among the previous audio frames prestored in the memory 1700, the data transmission apparatus 100 may transmit an identification value of a previous audio frame having the highest similarity to the data reproduction apparatus 1000.

In this case, the previous audio frame may also be prestored in the memory of the data reproduction apparatus 1000, and the data reproduction apparatus 1000 may extract the previous audio frame stored in the memory of the data reproduction apparatus 1000 by using the received identification value and output the extracted previous audio frame.

Also, when the transmission of the identification value of the selected previous audio frame is failed, the data transmission apparatus 100 may retransmit the identification value of the selected previous audio frame to the data reproduction apparatus 1000 within a preset transmission time limit.

Also, when the retransmission of the identification value of the selected previous audio frame is failed within the preset transmission time limit, the data transmission apparatus 100 may compress the current audio frame and transmit the compressed current audio frame to the data reproduction apparatus 1000. Alternatively, when the retransmission of the identification value of the selected previous audio frame is failed within the preset transmission time limit, the data transmission apparatus 100 may determine a next audio frame transmission method.

When it is determined in operation S1620 that the determined similarity is less than the preset threshold, the data transmission apparatus 100 may compress the current audio frame in operation S1640.

In operation S1650, the data transmission apparatus 100 may transmit the compressed current audio frame to the data reproduction apparatus 1000.

Figure 17:
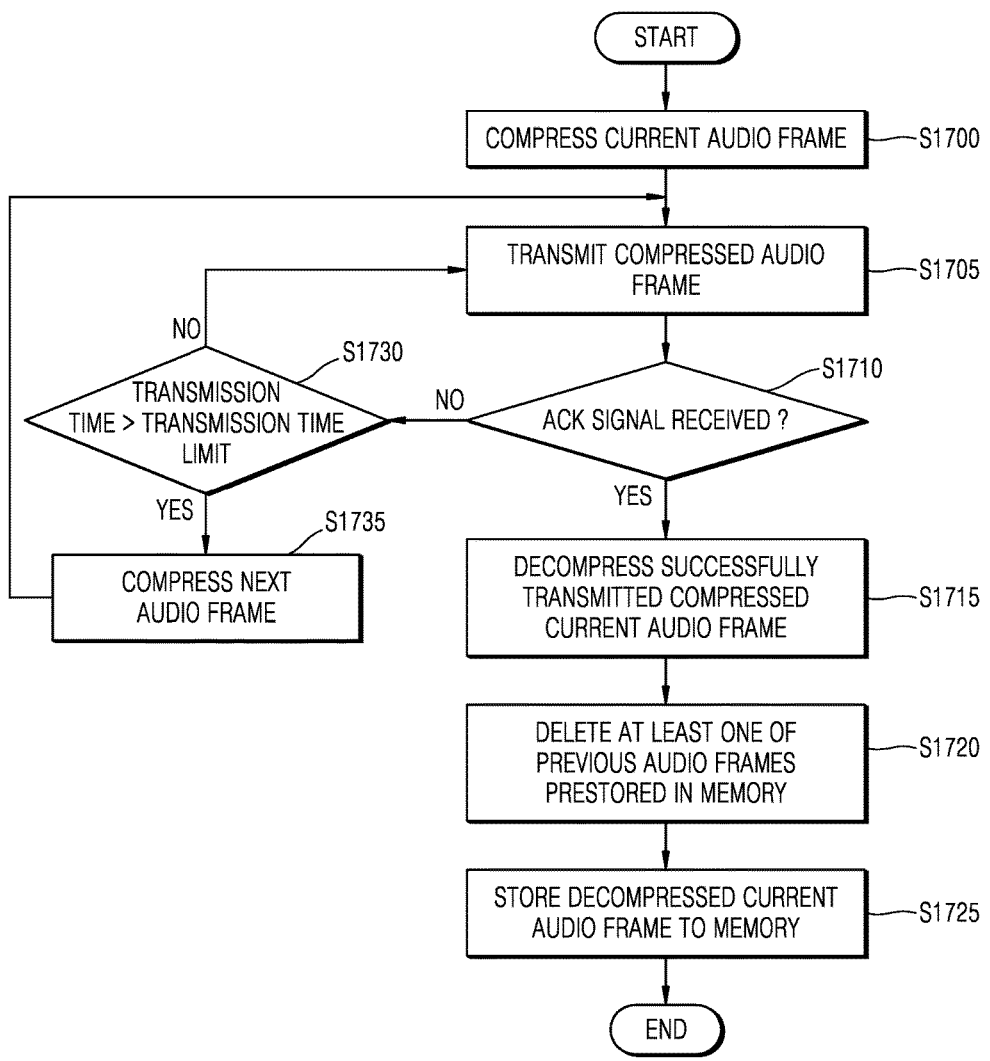
FIG. 17 is a flowchart of a method by which a data transmission apparatus 100 compresses a current audio frame and transmits the compressed current audio frame to a data reproduction apparatus 1000, according to some embodiments.

FIG. 17 is a flowchart of a method by which a data transmission apparatus 100 compresses a current audio frame and transmits the compressed current audio frame to a data reproduction apparatus 1000, according to some embodiments.

In operation S1700, the data transmission apparatus 100 may compress the current audio frame. In order to transmit the current audio frame to the data reproduction apparatus 1000, the data transmission apparatus 100 may compress the current audio frame into an audio bitstream by using various codec algorithms.

In operation S1705, the data transmission apparatus 100 may transmit the compressed audio frame to the data reproduction apparatus 1000. The data transmission apparatus 100 may transmit the compressed current audio frame to the data reproduction apparatus 1000. The data transmission apparatus 100 may check the transmission time of the compressed audio frame.

In operation S1710, the data transmission apparatus 100 may determine whether an ACK signal has been received from the data reproduction apparatus 1000. When the data reproduction apparatus 1000 successfully receives the compressed audio frame, the data reproduction apparatus 1000 may transmit the ACK signal to the data transmission apparatus 100. Also, when the data reproduction apparatus 1000 does not successfully receive the compressed audio frame, the data reproduction apparatus 1000 may transmit a NACK signal to the data transmission apparatus 100.

When it is determined in operation S710 that the data transmission apparatus 100 has received the ACK signal from the data reproduction apparatus 1000, the data transmission apparatus 100 may decompress the successfully transmitted compressed current audio frame in operation S1715.

In operation S1720, the data transmission apparatus 100 may delete at least one of the previous audio frames prestored in the memory 1700. The data transmission apparatus 100 may select at least one of the prestored previous audio frames according to a preset criterion and delete the selected previous audio frame from the memory 1700. As at least one of the previous audio frames prestored in the memory 1700 is deleted, a space to store the decompressed current audio frame may be secured within the memory 1700.

In operation S1730, the data transmission apparatus 100 may store the decompressed current audio frame in the memory 1700.

When it is determined in operation S1710 that the data transmission apparatus 100 has not received the ACK signal from the data reproduction apparatus 1000, the data transmission apparatus 100 may determine whether the transmission time of the compressed current audio frame has exceeded the transmission time limit in operation S1730. The transmission time limit may be a time limit preset for transmitting the compressed current audio frame and may be set according to various criteria.

When it is determined in operation S1730 that the transmission time of the compressed current audio frame has exceeded the transmission time limit, the data transmission apparatus 100 may compress a next audio frame. Then, in operation S1705, the data transmission apparatus 100 may transmit the compressed next audio frame to the data reproduction apparatus 1000.

Figure 18:
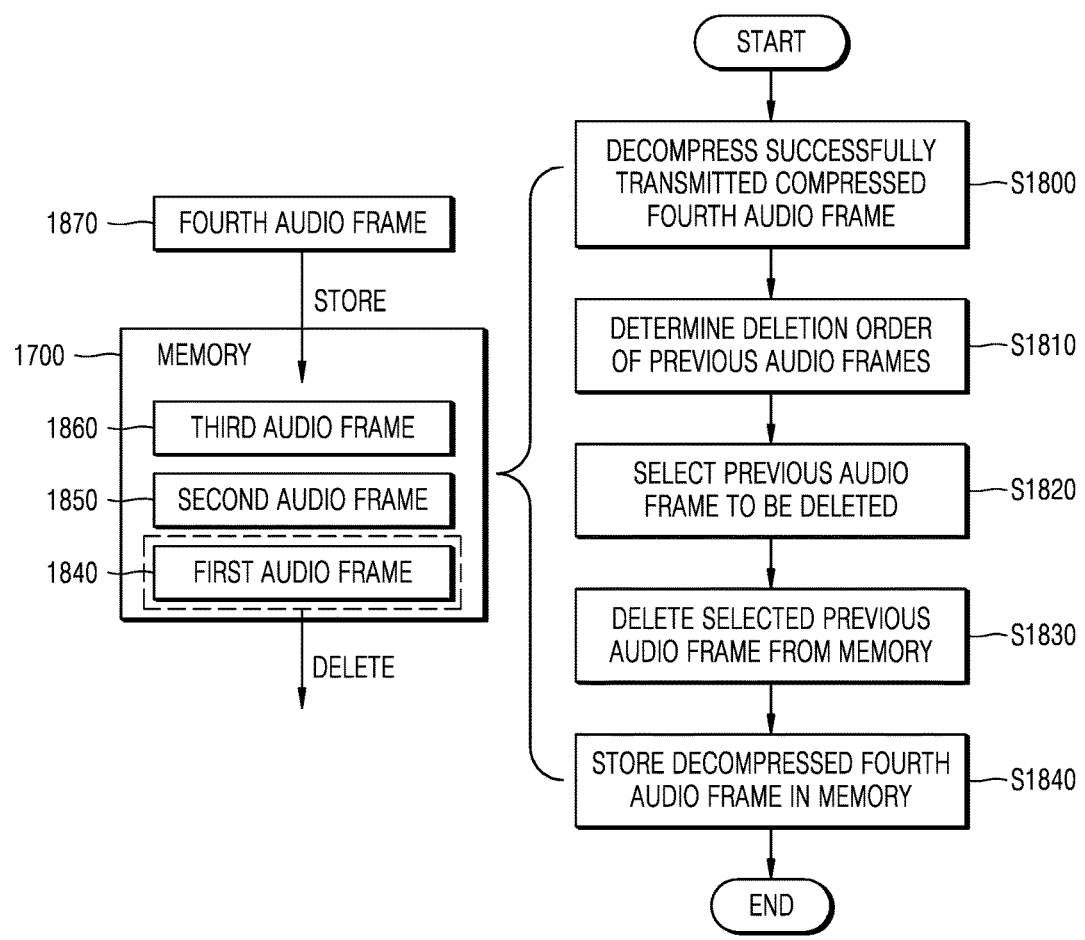
FIG. 18 is a flowchart of a method by which a data transmission apparatus 100 manages an audio frame, according to some embodiments.

FIG. 18 is a flowchart of a method by which the data transmission apparatus 100 manages an audio frame, according to some embodiments.

Referring to FIG. 18, a first audio frame 1840, a second audio frame 1850, and a third audio frame 1860, which are previous audio frames, may be stored in the memory 1700 of the data transmission apparatus 100, and the data transmission apparatus 100 may store a fourth audio frame 1870, which is a current audio frame, in the memory 1700.

In operation S1800, the data transmission apparatus 100 may decompress the successfully transmitted compressed fourth audio frame 1870. The fourth audio frame 1870 may be a current audio frame. When the compressed fourth audio frame 1870 is successfully transmitted to the data reproduction apparatus 1000, the data transmission apparatus 100 may decompress the compressed fourth audio frame 1870.

In operation S1810, the data transmission apparatus 100 may determine a deletion order of the previous audio frames. The data transmission apparatus 100 may determine the deletion order of the first audio frame 1840, the second audio frame 1850, and the third audio frame 1860.

The data transmission apparatus 100 may determine the deletion order of the previous audio frames based on the time when the previous audio frames were stored in the memory 1700. For example, the data transmission apparatus 100 may determine the deletion order such that the previous audio frame stored earlier in the memory 1700 is first deleted.

Alternatively, the data transmission apparatus 100 may determine the deletion order of the previous audio frames based on the number of times the identification value of the previous audio frame was transmitted to the data reproduction apparatus 1000. For example, the data transmission apparatus 100 may determine the deletion order such that the previous audio frames, whose number of times the identification value was transmitted to the data reproduction apparatus 1000 is small, is first deleted.

However, the criterion of the deletion order determined by the data transmission apparatus 100 is not limited to the above-described examples. The data transmission apparatus 100 may determine the deletion order based on various criteria by taking into account the type of the audio signal.

Also, the data transmission apparatus 100 may provide information about the determined deletion order to the data reproduction apparatus 1000. Accordingly, the data reproduction apparatus 1000 also may delete the previous audio frames stored in the data reproduction apparatus 1000 according to the determined deletion order. Also, the previous audio frames stored in the data transmission apparatus 100 may be synchronized with the previous audio frames stored in the data reproduction apparatus 1000.

In operation S1820, the data transmission apparatus 100 may select the previous audio frame to be deleted. For example, the data transmission apparatus 100 may select the first audio frame 1840 stored earliest in the memory 1700 among the first audio frame 1840, the second audio frame 1850, and the third audio frame 1860 stored in the memory 1700.

In operation S1830, the data transmission apparatus 100 may delete the selected previous audio frame from the memory 1700. The data transmission apparatus 100 may delete the selected first audio frame from the memory 1700.

In operation S1840, the data transmission apparatus 100 may store the decompressed fourth audio frame in the memory 1700.

Figure 19:
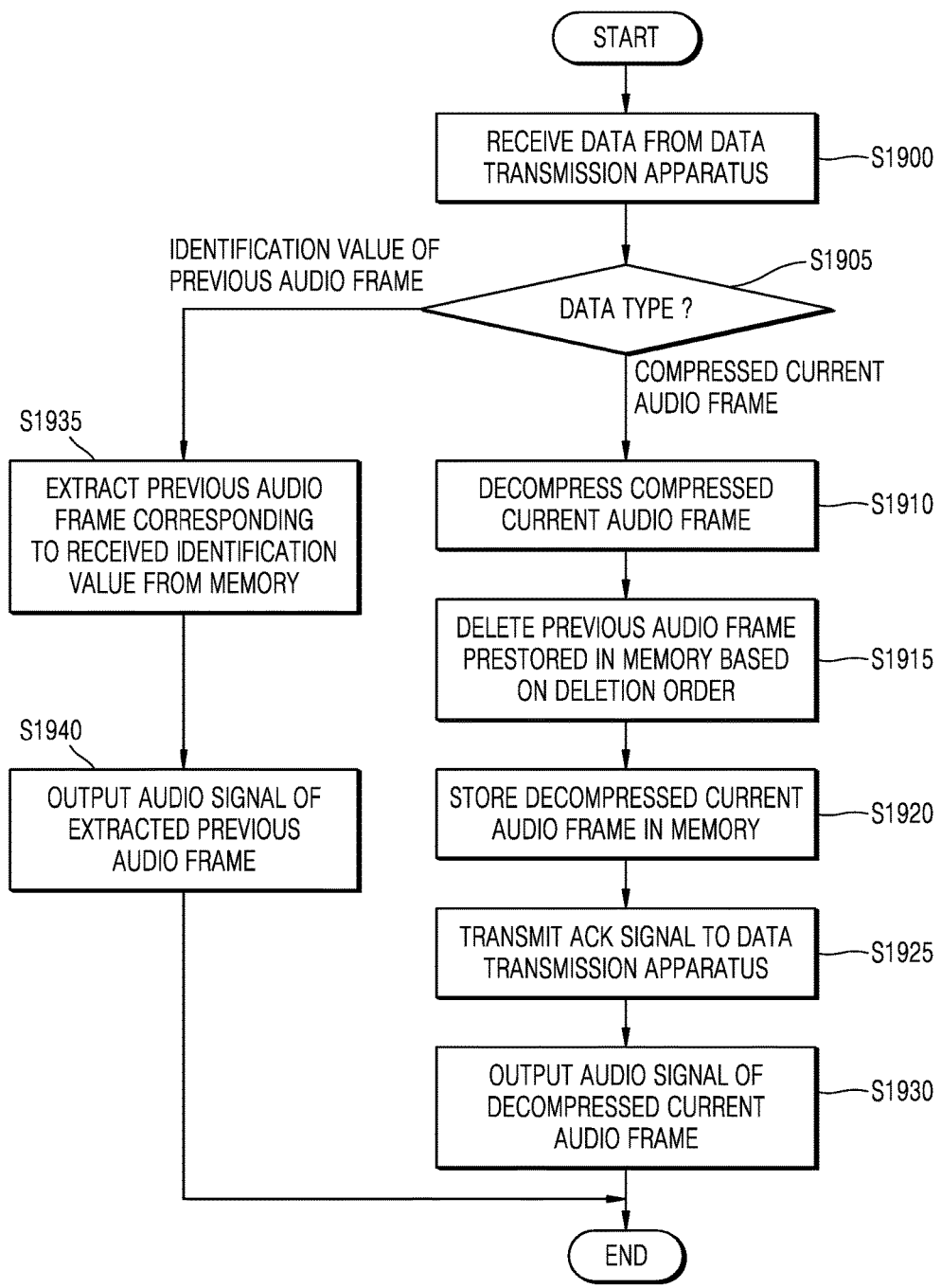
FIG. 19 is a flowchart of a method by which a data reproduction apparatus 1000 stores and manages an audio frame received from a data transmission apparatus 100, according to some embodiments.

FIG. 19 is a flowchart of a method by which the data reproduction apparatus 1000 stores and manages an audio frame received from the data transmission apparatus 100, according to some embodiments.

In operation S1900, the data reproduction apparatus 1000 may receive data related to the audio signal from the data transmission apparatus 100. The data reproduction apparatus 1000 may receive the compressed current audio frame or the identification value of the previous audio frame from the data transmission apparatus 100.

In operation S1905, the data reproduction apparatus 1000 may identify a data type of the received data. The data reproduction apparatus 1000 may determine whether the data related to the audio signal, which is received from the data transmission apparatus 100, is the compressed current audio frame or the identification value of the previous audio frame.

When it is determined in operation S1905 that the type of the identified data is the compressed current audio frame, the data reproduction apparatus 1000 may decompress the compressed current audio frame in operation S1910.

In operation S1910, the data reproduction apparatus 1000 may delete the previous audio frames prestored in the memory of the data reproduction apparatus 1000, based on a preset deletion order. In this case, the data reproduction apparatus 1000 may previously receive a setting value related to the deletion order from the data transmission apparatus 100 and then store the received setting value. The same setting value related to the deletion order may be stored in the data transmission apparatus 100 and the data reproduction apparatus 1000. However, embodiments of the present disclosure are not limited thereto. The data reproduction apparatus 1000 may generate the setting value related to the deletion order based on a user input and provide the generated setting value to the data transmission apparatus 100.

Also, the data reproduction apparatus 1000 may delete at least one of the previous audio frames prestored in the memory according to the setting value related to the deletion order. As the previous audio frame is deleted from the memory, a storage space to store the current audio frame may be secured within the memory.

In operation S1920, the data reproduction apparatus 1000 may store the decompressed current audio frame in the memory.

In operation S1925, the data reproduction apparatus 1000 may transmit an ACK signal to the data transmission apparatus 100. In order to notify the data transmission apparatus 100 that the compressed current audio frame has been successfully received, the data reproduction apparatus 1000 may transmit the ACK signal to the data transmission apparatus 100. Accordingly, the data transmission apparatus 100 may receive the ACK signal and determine that the compressed current audio frame has been successfully transmitted to the data reproduction apparatus 1000. Also, the data transmission apparatus 100 may delete the previous audio frame prestored in the memory 1700 of the data transmission apparatus 100, decompress the compressed current audio frame, and store the decompressed current audio frame in the memory 1700. In this case, the data transmission apparatus 100 may delete the previous audio frames according to the same deletion order as that of the data reproduction apparatus 1000.

In operation S1930, the data reproduction apparatus 1000 may output an audio signal of the decompressed current audio frame.

When it is determined in operation S1905 that the type of the identified data is the identification value of the previous audio frame, the data reproduction apparatus 1000 may extract the previous audio frame corresponding to the received identification value from the memory of the data reproduction apparatus 1000 in operation S1935. The data reproduction apparatus 1000 may extract the previous audio frame having the received identification value.

In operation S1910, the data reproduction apparatus 1000 may output an audio signal of the extracted previous audio frame.

On the other hand, it has been described that the data transmission apparatus 100 and the data reproduction apparatus 1000 delete the previous audio frame by using the same setting value related to the deletion order so as to store and delete the same previous audio frame, but embodiments of the present disclosure are not limited thereto. The data reproduction apparatus 1000 may delete the previous audio frame and provide the identification value of the deleted previous audio frame to the data transmission apparatus 100, and the data transmission apparatus 100 may delete the same previous audio frame as the previous audio frame deleted by the data reproduction apparatus 1000 from the memory 1700 of the data transmission apparatus 100 by using the identification value of the deleted previous audio frame received from the data reproduction apparatus 1000.

The data reproduction apparatus 1000 may transmit the ACK signal to the data transmission apparatus 100 before operation S1915, and the data transmission apparatus 100 may receive the ACK signal and delete the previous audio frame from the memory 1700 of the data transmission apparatus 100. Also, the data transmission apparatus 100 may provide the identification value of the deleted previous audio frame to the data reproduction apparatus 1000, and the data reproduction apparatus 1000 may delete the same previous audio frame as the previous audio frame deleted by the data transmission apparatus 100 from the memory of the data reproduction apparatus 1000 by using the identification value of the deleted previous audio frame received from the data transmission apparatus 100.

Accordingly, the same audio frame may be stored in or deleted from the memory of the data reproduction apparatus 1000 and the memory 1700 of the data transmission apparatus 100.

Figure 20:
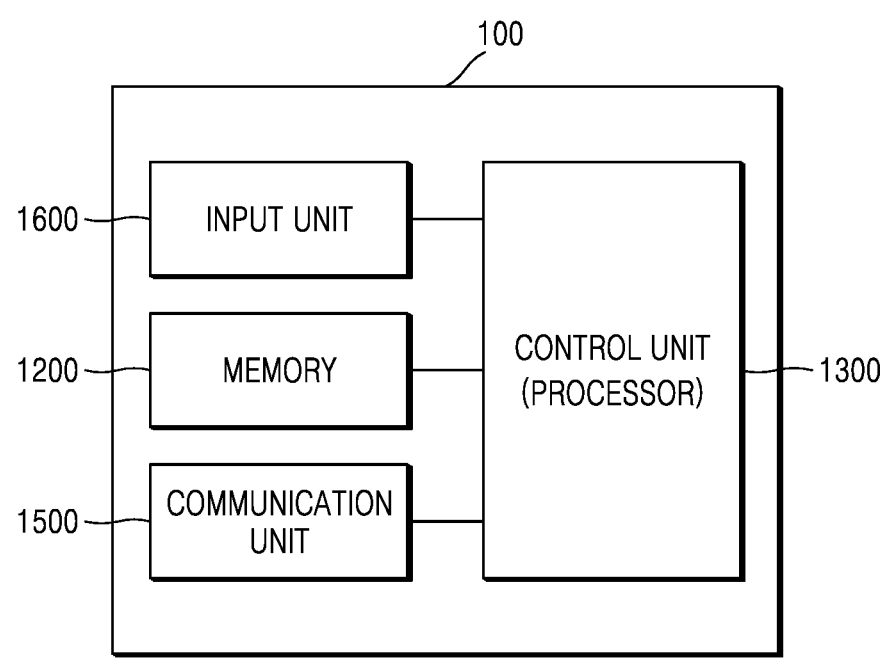
FIGS. 20 and 21 are block diagrams of a data transmission apparatus 100 according to some embodiments.
Figure 21:
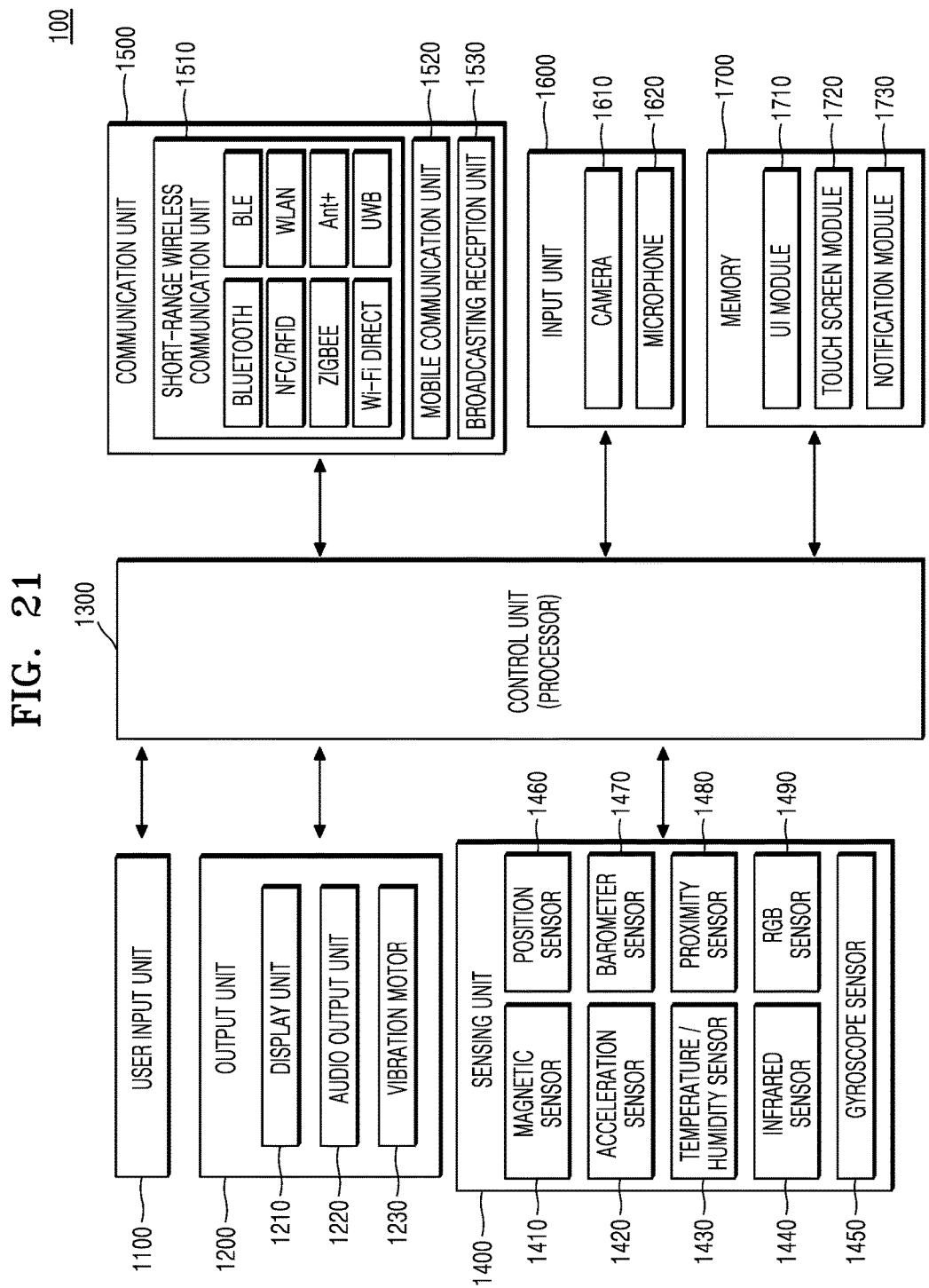

FIGS. 20 and 21 are block diagrams of a data transmission apparatus 100 according to some embodiments.

As illustrated in FIG. 20, the data transmission apparatus 100 according to some embodiments may include a user input unit 1100, an output unit 1200, a control unit (processor) 1300, and a communication unit 1500. However, all elements illustrated in FIG. 6 are not essential to the data transmission apparatus 100. The data transmission apparatus 100 may be implemented with a larger number of elements than those illustrated in FIG. 20, or may be implemented with a smaller number of elements than those illustrated in FIG. 20.

For example, as illustrated in FIG. 21, the data transmission apparatus 100 according to some embodiments may further include a sensing unit 1400, an A/V input unit 1600, and a memory 1700, in addition to the user input unit 1100, the output unit 1200, the control unit 1300, and the communication unit 1500.

The user input unit 1100 is a unit that allows the user to input data for controlling the data transmission apparatus 100. For example, the user input unit 1100 may include a key pad, a dome switch, a touch pad (a touch-type capacitive touch pad, a pressure-type resistive touch pad, an infrared beam sensing type touch pad, a surface acoustic wave type touch pad, an integral strain gauge type touch pad, a piezo effect type touch pad, or the like), a jog wheel, and a jog switch, but is not limited thereto.

The user input unit 1100 may receive a user input of setting a threshold to be compared with similarities of a current audio frame and previous audio frames, a user input of setting a transmission time limit of the current audio frame, and a user input of setting a deletion order of the previous audio frames.

The output unit 1200 may output an audio signal, a video signal, or a vibration signal. The output unit 1200 may include a display unit 1210, an audio output unit 1220, and a vibration motor 1230.

The display unit 1210 may display information processed by the data transmission apparatus 100. For example, the display unit 1210 may display information related to data transmission between the data transmission apparatus 100 and the data reproduction apparatus 1000. For example, the display unit 1210 may display a transmission ratio of an audio frame identification value and power efficiency. Also, the display unit 1210 may display information about a synchronization situation of the previous audio frame stored in the data transmission apparatus 100 and the previous audio frame stored in the data reproduction apparatus 1000.

On the other hand, in a case where the display unit 1210 and the touch pad form a layered structure to constitute a touch screen, the display unit 1210 may also be used as an input device as well as an output device. The display unit 1210 may include at least one selected from among a liquid crystal display (LCD), a thin film transistor-liquid crystal display (TFT-LCD), an organic light-emitting diode (OLED), a flexible display, a 3D display, and an electrophoretic display. According to embodiments, the data transmission apparatus 100 may include two or more display units 1210. The two or more display units 1210 may be disposed to face each other by using a hinge.

The audio output unit 1220 outputs audio data that is received from the communication unit 1500 or is stored in the memory 1700. Also, the audio output unit 1220 may output an audio signal related to functions performed by the data transmission apparatus 100, such as a call signal reception sound, a message reception sound, and a notification sound. The audio output unit 1220 may include a speaker, a buzzer, and the like.

The vibration motor 1230 may output a vibration signal. For example, the vibration motor 1230 may output a vibration signal corresponding to an output of audio data or video data (for example, a call signal reception sound, a message reception sound, or the like). Also, the vibration motor 1230 may output a vibration signal when a touch is input to a touch screen.

The control unit 1300 may control an overall operation of the data transmission apparatus 100. For example, the control unit 1300 may control overall operations of the user input unit 1100, the output unit 1200, the sensing unit 1400, the communication unit 1500, and the A/V input unit 1600 by executing programs stored in the memory 1700.

Specifically, the control unit 1300 may divide an audio signal input to the data transmission apparatus 100 into a plurality of audio frames. The data transmission apparatus 100 may receive a voice input from a user or may receive an audio signal provided from another device (not illustrated), and the control unit 1300 may continuously divide the audio signal over time.

The control unit 1300 may compare the current audio frame with at least one audio frame prestored in the memory 1700 of the data transmission apparatus 100. The audio frame prestored in the memory 1700 may be an audio frame prior to the current audio frame. Also, the audio frame prestored in the memory 1700 may be a previous audio frame successfully transmitted to the data reproduction apparatus 1000.

The control unit 1300 may determine similarity of the previous audio frame and the current audio frame by comparing the previous audio frame prestored in the memory 1700 with the current audio frame. For example, the control unit 1300 may determine the similarity of the previous audio frame and the current audio frame by calculating a correlation value of the previous audio frame and the current audio frame. The correlation value of the previous audio frame and the current audio frame may be calculated by using mean square error (MSE) or the like. However, embodiments of the present disclosure are not limited thereto. The similarity of the previous audio frame and the current audio frame may be determined through various techniques.

The control unit 1300 may determine whether the determined similarity is greater than a preset threshold. The preset threshold may be variously set according to, for example, a type of an audio signal, an audio signal division method, a specification of the data transmission apparatus 100, and a specification of the data reproduction apparatus 1000.

Also, when the determined similarity is greater than the preset threshold, the data control unit 1300 may provide an identification value of the previous audio frame prestored in the memory 1700 to the data reproduction apparatus 1000. The control unit 1300 may provide the identification value of the previous audio frame having the determined similarity to the data reproduction apparatus 1000.

When there are a plurality of audio frames having similarities equal to or greater than the threshold among the previous audio frames prestored in the memory 1700, the control unit 1300 may provide an identification value of a previous audio frame having the highest similarity to the data reproduction apparatus 1000.

In this case, the previous audio frame may also be prestored in the memory of the data reproduction apparatus 1000, and the data reproduction apparatus 1000 may extract the previous audio frame stored in the memory of the data reproduction apparatus 1000 by using the received identification value and output the extracted audio frame.

On the other hand, when the determined similarity is less than the preset threshold, the control unit 1300 may compress the current audio frame. Also, the control unit 1300 may provide the compressed current audio frame to the data reproduction apparatus 1000.

On the other hand, the control unit 1300 may compress the current audio frame and provide the compressed current audio frame to the data reproduction apparatus 1000, and may manage the previous audio frame stored in the memory 1700.

The control unit 1300 may compress the current audio frame. In order to provide the current audio frame to the data reproduction apparatus 1000, the control unit 1300 may compress the current audio frame into an audio bitstream by using various codec algorithms.

The control unit 1300 may provide the compressed current audio frame to the data reproduction apparatus 1000. The control unit 1300 may check the transmission time of the compressed audio frame.

The control unit 1300 may determine whether an ACK signal has been received from the data reproduction apparatus 1000. When the data reproduction apparatus 1000 successfully receives the compressed audio frame, the data reproduction apparatus 1000 may transmit the ACK signal to the data transmission apparatus 100. Also, when the data reproduction apparatus 1000 does not successfully receive the compressed audio frame, the data reproduction apparatus 1000 may transmit a NACK signal to the data transmission apparatus 100.

When it is determined that the data transmission apparatus 100 has received the ACK signal from the data reproduction apparatus 1000, the control unit 1300 may decompress the successfully transmitted compressed current audio frame.

The control unit 1300 may delete at least one of the previous audio frames prestored in the memory 1700. The control unit 1300 may select at least one of the prestored previous audio frames according to a preset criterion and delete the selected previous audio frame from the memory 1700. As at least one of the previous audio frames prestored in the memory 1700 is deleted, a space to store the decompressed current audio frame may be secured within the memory 1700.

The control unit 1300 may store the decompressed current audio frame in the memory 1700.

Also, when it is determined that the data transmission apparatus 100 has not received the ACK signal from the data reproduction apparatus 1000, the control unit 1300 may determine whether the transmission time of the compressed current audio frame has exceeded the transmission time limit. The transmission time limit may be a time limit preset for transmitting the compressed current audio frame and may be set according to various criteria.

When it is determined that the transmission time of the compressed current audio frame has exceeded the transmission time limit, the control unit 1300 may compress a next audio frame. Then, the control unit 1300 may provide the compressed next audio frame to the data reproduction apparatus 1000.

The sensing unit 1400 may sense a state of the data transmission apparatus 100 or a state around the data transmission apparatus 100 and transmit sensed information to the control unit 1300.

The sensing unit 1400 may include at least one selected from among a magnetic sensor 1410, an acceleration sensor 1420, a temperature/humidity sensor 1430, an infrared sensor 1440, a gyroscope sensor 1450, a position sensor (e.g., global positioning system (GPS)) 1460, a barometer sensor 1470, a proximity sensor 1480, and an RGB sensor (illuminance sensor) 1490, but is not limited thereto. Since the functions of the respective sensors may be intuitively inferred from their names, detailed descriptions thereof will be omitted.

The communication unit 1500 may include one or more elements for communication between the data transmission apparatus 100 and the data reproduction apparatus 1000. For example, the communication unit 1500 may include a short-range wireless communication unit 1510, a mobile communication unit 1520, and a broadcasting reception unit 1530.

The short-range wireless communication unit 151 may include a Bluetooth communication unit, a Bluetooth low energy (BLE) communication unit, a near field communication unit, a wireless local access network (WLAN) (Wi-Fi) communication unit, a Zigbee communication unit, an infrared data association (IrDA) communication unit, a Wi-Fi direction (WFD) communication unit, an ultra wideband (UWB) communication unit, or an Ant+ communication unit, but is not limited thereto.

The mobile communication unit 1520 may transmit and receive a wireless signal with at least one selected from among a base station, an external terminal, and a server through a mobile communication network. The wireless signal may include a voice call signal, a video call signal, or various types of data according to transmission and reception of text/multimedia messages.

The broadcasting reception unit 1530 may receive broadcasting signals and/or broadcasting-related information from the outside through a broadcasting channel. The broadcasting channel may include a satellite channel and a terrestrial channel. According to embodiments, the data transmission apparatus 100 may not include the broadcasting reception unit 1530.

Also, the communication unit 1500 may receive standard audio frames so as to previously store commonly used audio frame samples in the memory 1700.

The input unit 1600 may receive audio or video signals and may include a camera 1610, a microphone 1620, and the like. The camera 1610 may acquire an image frame, such as a still image or a moving image, through an image sensor in a video call mode or a photographing mode. An image captured by the image sensor may be processed by the control unit 1300 or a separate image processor (not illustrated).

The image frame processed by the camera 1610 may be stored in the memory 1700 or may be transmitted to the outside through the communication unit 1500. The camera 1610 may include two or more cameras according to a configuration type of a terminal.

The microphone 1620 may receive external audio signals and process the external audio signals into electrical voice data. For example, the microphone 1620 may receive audio signals from an external device 200 or a person. The microphone 1620 may use various noise removal algorithms for removing noise generated in the process of receiving external audio signals.

The memory 1700 may store a program for processing and control of the controller 1300, and may store data input to the data transmission apparatus 100 or data output from the data transmission apparatus 100. Also, the memory 1700 may be used as a buffer memory that stores the previous audio frames.

The memory 1700 may include at least one storage medium selected from among a flash memory, a hard disk, a multimedia card micro type memory, a card type memory (e.g., SD or XD memory), random access memory (RAM), static random access memory (SRAM), read-only memory (ROM), electrically erasable programmable read-only memory (EEPROM), programmable read-only memory (PROM), a magnetic memory, a magnetic disk, and an optical disk.

The programs stored in the memory 1700 may be classified into a plurality of modules according to functions thereof. For example, the programs may be classified into a UI module 1710, a touch screen module 1720, and a notification module 1730.

The UI module 1710 may provide a specialized UI or GUI that interworks with the data transmission apparatus 100 according to each application. The touch screen module 1720 may detect a user's touch gesture on a touch screen and transmit information about the touch gesture to the control unit 1300. According to some embodiments, the touch screen module 1720 may recognize and analyze a touch code. The touch screen module 1720 may be implemented by separate hardware including a controller.

Various sensors may be provided inside or near the touch screen so as to detect a touch on the touch screen or hovering above the touch screen. An example of the sensor that detects the touch on the touch screen may be a tactile sensor. The tactile sensor may sense a contact of a specific object at or beyond a sensitivity of a person. The tactile sensor may sense a variety of information, such as roughness of a contact surface, hardness of a contact object, a temperature of a contact point, or the like.

Also, an example of the sensor that senses the touch on the touch screen may be a proximity sensor.

The proximity sensor refers to a sensor that detects the presence or absence of an object approaching a predetermined detection surface or an object existing near the sensor by using an electromagnetic force or infrared light, without mechanical contact. Examples of the proximity sensor includes a transmission-type photoelectric sensor, a direct reflection-type photoelectric sensor, a mirror reflection-type photoelectric sensor, a radio frequency oscillation-type proximity sensor, an electrostatic capacitance type proximity sensor, a magnetic-type proximity sensor, and an infrared proximity sensor. A gesture of the user may include a tap, a touch-and-hold, a double-tap, a drag, a panning, a flick, a drag-and-drop, a swipe, and the like.

The notification module 1730 may generate a signal for notifying the user of an occurrence of an event in the data transmission apparatus 100. Examples of the event occurring in the data transmission apparatus 100 may include a call signal reception, a message reception, a key signal input, and a schedule notification. The notification module 1730 may output a notification signal through the display unit 1210 in the form of a video signal. The notification module 1730 may output a notification signal through the audio output unit 1220 in the form of an audio signal. The notification module 1730 may output a notification signal through a vibration motor 1230 in the form of a vibration signal.

On the other hand, the data reproduction apparatus 1000 according to some embodiments may include substantially the same configuration as the data transmission apparatus 100 illustrated in FIGS. 20 and 21.

The control unit of the data reproduction apparatus 1000 may receive data related to the audio signal from the data transmission apparatus 100 through the communication unit.

The control unit of the data reproduction apparatus 1000 may identify a data type of the received data. The control unit of the data reproduction apparatus 1000 may determine whether the data related to the audio signal, which is received from the data transmission apparatus 100, is a compressed current audio frame or an identification value of a previous audio frame.

When it is determined that the type of the identified data is the compressed current audio frame, the control unit of the data reproduction apparatus 1000 may decompress the compressed current audio frame.

The control unit of the data reproduction apparatus 1000 may delete the previous audio frames prestored in the memory of the data reproduction apparatus 1000, based on a preset deletion order. In this case, the control unit of the data reproduction apparatus 1000 may previously receive a setting value related to the deletion order from the data transmission apparatus 100 and then store the received setting value. The same setting value related to the deletion order may be stored in the data transmission apparatus 100 and the data reproduction apparatus 1000. However, embodiments of the present disclosure are not limited thereto. The control unit of the data reproduction apparatus 1000 may generate the setting value related to the deletion order based on a user input and provide the generated setting value to the data transmission apparatus 100.

The control unit of the data reproduction apparatus 1000 may delete at least one of the previous audio frames prestored in the memory according to the setting value related to the deletion order. As the previous audio frame is deleted from the memory, a storage space to store the current audio frame may be secured within the memory.

The control unit of the data reproduction apparatus 1000 may store the decompressed current audio frame in the memory.

The control unit of the data reproduction apparatus 1000 may provide an ACK signal to the data transmission apparatus 100. In order to notify the data transmission apparatus 100 that the compressed current audio frame has been successfully received, the control unit of the data reproduction apparatus 1000 may transmit the ACK signal to the data transmission apparatus 100. Accordingly, the data transmission apparatus 100 may receive the ACK signal and determine that the compressed current audio frame has been successfully transmitted to the data reproduction apparatus 1000. Also, the data transmission apparatus 100 may delete the previous audio frame prestored in the memory 1700 of the data transmission apparatus 100, decompress the compressed current audio frame, and store the decompressed current audio frame in the memory 1700. In this case, the data transmission apparatus 100 may delete the previous audio frames according to the same deletion order as that of the data reproduction apparatus 1000.

The control unit of the data reproduction apparatus 1000 may output an audio signal of the decompressed current audio frame through the output unit of the data reproduction apparatus 1000.

When the type of the identified data is the identification value of the previous audio frame, the control unit of the data reproduction apparatus 1000 may extract the previous audio frame corresponding to the received identification value from the memory of the data reproduction apparatus 1000. The control unit of the data reproduction apparatus 1000 may extract the previous audio frame having the received identification value.

The control unit of the data reproduction apparatus 1000 may output an audio signal of the extracted previous audio frame.

The present invention may be embodied as computer-readable codes on a non-transitory computer-readable recording medium. The non-transitory computer-readable recording medium may be any recording medium that can store data which can be thereafter read by a computer system.

Examples of the non-transitory computer-readable recording medium may include read-only memory (ROM), random access memory (RAM), compact disk-ROMs (CD-ROMs), magnetic tapes, floppy disks, and optical data storage devices, and may also include media implemented in the form of carrier wave (e.g., transmission through the Internet). The non-transitory computer-readable recording medium can also be distributed over network-coupled computer systems so that the computer-readable code is stored and executed in a distributed fashion. In addition, functional programs, codes, and code segments for accomplishing the present invention can be easily construed by programmers skilled in the art to which the present invention pertains.

The exemplary embodiments of the present disclosure have been described. It can be understood that various modifications and changes can be made without departing from the scope of the present disclosure by one of skilled in the art to which the present disclosure pertains. Accordingly, the disclosed embodiments are to be considered as illustrative and not restrictive. The scope of the present disclosure is defined not by the detailed description of the present disclosure but by the appended claims, and all differences within the scope will be construed as being included in the present disclosure.

The invention claimed is:

1. A first device, which provides an audio signal to a second device, the first device comprising:
   a memory that stores at least one previous audio frame;
   a controller that:
      determines a packet size based on a bandwidth supported by a channel mode,
      determines using lossless codec, when the packet size is larger than a data threshold,
      determines a frame size based on the packet size, when the packet size is smaller than or equal to the data threshold, divides an audio signal input to the first device into a plurality of audio frames based on the frame size, compares a current audio frame among the plurality of audio frames with the at least one previous audio frame prestored in the memory of the first device, and selects one of the prestored previous audio frames based on similarity of the prestored previous audio frame and the current audio frame; and a communicator that transmits an identification value of the selected previous audio frame to the second device instead of compressed data for the current audio frame.

2. The first device of claim 1, wherein, when the similarity of the prestored previous audio frame and the current audio frame is greater than a preset threshold, the controller selects one of the prestored previous audio frames.

3. The first device of claim 1, wherein, when the similarity of the prestored previous audio frame and the current audio frame is less than a preset threshold, the controller compresses the current audio frame, and the communicator transmits the compressed current audio frame to the second device.

4. The first device of claim 3, wherein, when the compressed current audio frame is successfully transmitted to the second device, the controller deletes at least one of the prestored previous audio frames, and when the at least one of the prestored previous audio frames is deleted, the controller stores the current audio frame in the memory.

5. The first device of claim 4, wherein the controller deletes a previous audio frame stored earlier in the memory among the prestored previous audio frames.

6. The first device of claim 4, wherein the controller deletes one of the prestored previous audio frames based on a number of times the identification value of the prestored previous audio frame was transmitted to the second device.

7. The first device of claim 1, wherein, when the transmission of the identification value of the selected previous audio frame is failed, the communicator retransmits the identification value of the selected previous audio frame to the second device within a preset transmission time limit.

8. The first device of claim 7, wherein, when the retransmission of the identification value of the selected previous audio frame is failed within the preset transmission time limit, the controller determines a next audio frame transmission method.

9. A method by which a first device provides an audio signal to a second device, the method comprising:
determining a packet size based on a bandwidth supported by a channel mode,
determining using lossless codec, when the packet size is larger than a data threshold,
determining a frame size based on the packet size, when the packet size is smaller than or equal to the data threshold,
dividing an audio signal input to the first device into a plurality of audio frames based on the frame size;
comparing a current audio frame among the plurality of audio frames with the at least one previous audio frame prestored in a memory of the first device;
selecting one of the prestored previous audio frames based on similarity of the prestored previous audio frame and the current audio frame; and
transmitting an identification value of the selected previous audio frame to the second device instead of compressed data for the current audio frame.

10. The method of claim 9, wherein, when the selected previous audio frame is successfully transmitted to the second device, the selected previous audio frame is stored in the memory and a memory of the second device.

11. The method of claim 9, wherein the selecting of the prestored previous audio frames comprises selecting one of the prestored previous audio frames when the similarity of the prestored previous audio frame and the current audio frame is greater than a preset threshold.

12. The method of claim 9, further comprising:
when the similarity of the prestored previous audio frame and the current audio frame is less than a preset threshold, compressing the current audio frame; and
transmitting the compressed current audio frame to the second device.

13. The method of claim 12, further comprising:
when the compressed current audio frame is successfully transmitted to the second device, deleting at least one of the prestored previous audio frames; and
when the at least one of the prestored previous audio frames is deleted, storing the current audio frame in the memory.

* * * * *